United States Patent
Duvedi et al.

(10) Patent No.: US 11,698,914 B1
(45) Date of Patent: Jul. 11, 2023

(54) SERVERLESS MANAGED BULK IMPORT ON A GLOBAL NOSQL DATABASE WITH SELECTIVE BACK PRESSURE

(71) Applicant: Amazon Technologies, Inc., Seattle, WA (US)

(72) Inventors: Divyank Duvedi, Seattle, WA (US); Akshat Vig, Seattle, WA (US); Somasundaram Perianayagam, Seattle, WA (US); Nicholas Gordon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 17/548,042

(22) Filed: Dec. 10, 2021

(51) Int. Cl.
| | |
|---|---|
| *G06F 16/00* | (2019.01) |
| *G06F 16/25* | (2019.01) |
| *G06F 16/22* | (2019.01) |
| *G06F 16/27* | (2019.01) |
| *G06F 16/28* | (2019.01) |

(52) U.S. Cl.
CPC ........ *G06F 16/252* (2019.01); *G06F 16/2228* (2019.01); *G06F 16/278* (2019.01); *G06F 16/28* (2019.01)

(58) Field of Classification Search
CPC ................................. G06F 16/00; G06F 16/21
See application file for complete search history.

(56) References Cited

U.S. PATENT DOCUMENTS

| | | | |
|---|---|---|---|
| 9,632,878 B1* | 4/2017 | Maccanti | G06F 11/2094 |
| 9,633,051 B1* | 4/2017 | Maccanti | G06F 11/1464 |
| 9,703,814 B1 | 7/2017 | Shams et al. | |
| 9,825,652 B1* | 11/2017 | Lazier | H04L 67/1097 |
| 9,860,317 B1* | 1/2018 | Gupta | H04L 67/1097 |
| 9,866,242 B1* | 1/2018 | Lazier | H04L 67/1097 |
| 10,025,673 B1* | 7/2018 | Maccanti | G06F 11/1451 |
| 11,409,796 B1* | 8/2022 | Surani | G06F 21/6227 |
| 2010/0262632 A1 | 10/2010 | Jain et al. | |
| 2014/0244585 A1* | 8/2014 | Sivasubramanian | G06F 16/21 707/639 |
| 2016/0291882 A1* | 10/2016 | Wakhare | G06F 9/45545 |
| 2017/0264559 A1* | 9/2017 | Lu | H04L 67/1095 |
| 2017/0277709 A1* | 9/2017 | Strauss | G06F 3/0604 |
| 2019/0102384 A1* | 4/2019 | Hung | G06F 9/45558 |
| 2021/0034474 A1* | 2/2021 | Khandkar | G06F 11/1469 |

* cited by examiner

*Primary Examiner* — Cheryl Lewis
(74) *Attorney, Agent, or Firm* — Robert C. Kowert; Kowert, Hood, Munyon, Rankin & Goetzel, P.C.

(57) ABSTRACT

A system receives a request to import data file(s) from a source data store into a target database. The system reserves a first portion of computing resources that host the target database to import the data file(s). The reservation of the first portion of computing resources permits the import throughput rate of the data file(s) through the first portion of computing resources while maintaining a second portion of the computing resources to support client access to the target database at an access throughput rate. The system initiates import of the data file(s) from the source data store to the target database through one or more storage nodes at the import throughput rate according to the first portion of computing resources. The target database is able to receive access requests from one or more clients during the import of the data file(s) to the target database.

20 Claims, 17 Drawing Sheets

US 11,698,914 B1

SERVERLESS MANAGED BULK IMPORT ON A GLOBAL NOSQL DATABASE WITH SELECTIVE BACK PRESSURE

BACKGROUND

Importing data from an current database system (e.g, SQL or relational, legacy systems) into a new database system (e.g., NoSQL, nonrelational) may require custom development and long-term maintenance. As organizations accelerate the growth of application data in current database systems, these organization may find that existing solutions to import and index data from the current database systems may become slower and less reliable and may not scale with the needs of their business. In some aspects, handling and processing large-scale (e.g., petabyte-scale) data with existing solutions may consume write capacity, which may adversely affect the production table and may require additional planning and additional costs.

Figure 1:
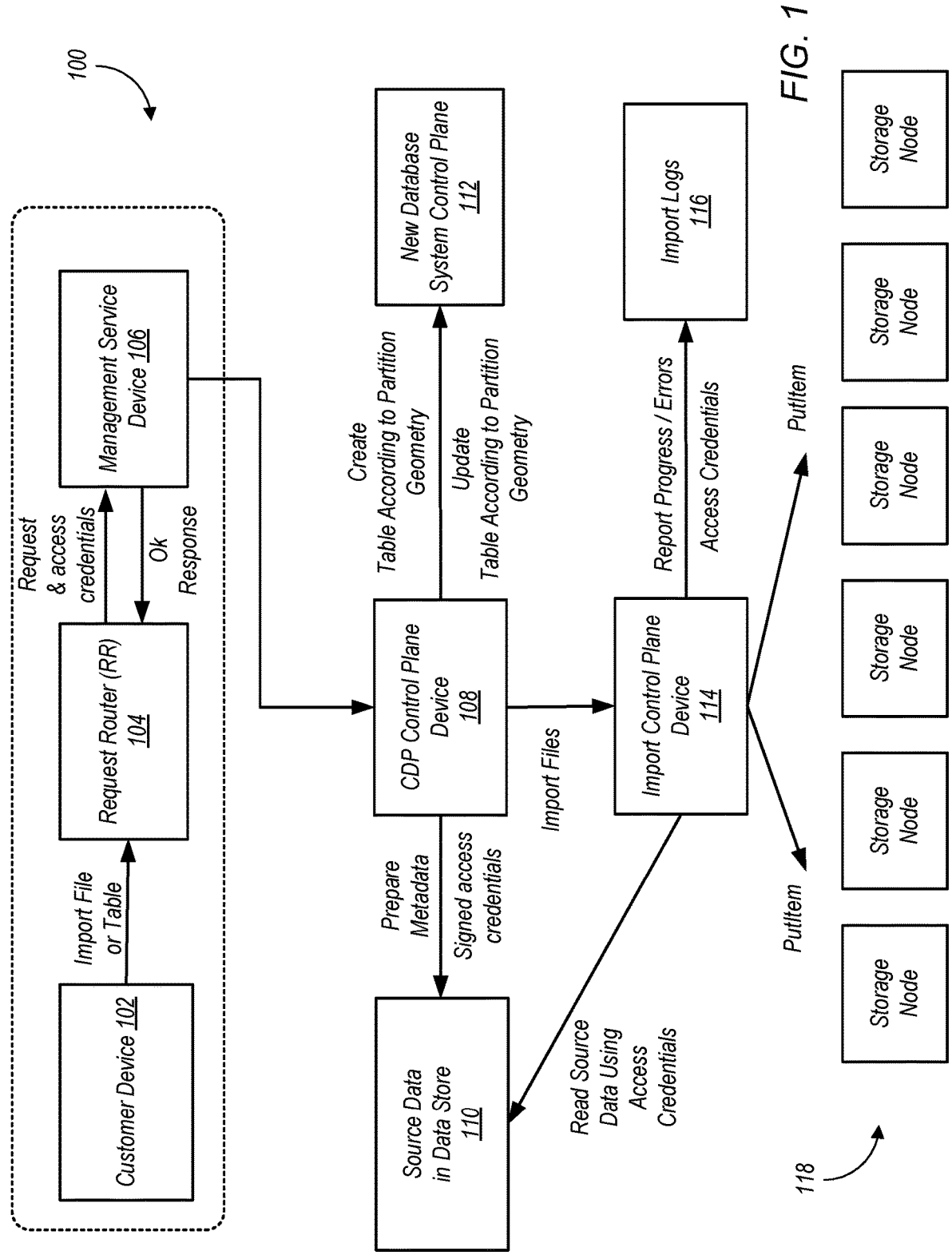
FIG. 1 illustrates an example data import system according to some aspects.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Some new databases used for mission-critical workloads may need consistent, single-digit millisecond performance at infinite scale. Data may be stored in many sources including legacy databases that may not be adequate to accommodate the current storage data processing demands including offline workflows. The techniques described herein may implement a server-less solution for importing data from a legacy database system to a new database system. Using a management console or via a command line interface (CLI)/an application program interface (API), data may import directly from the legacy database system into one or more data tables of a new database system. This solution may eliminate or reduce the often-prohibitive costs of administration, maintenance, and upfront hardware and may scale operating requirements, while consuming little to no write capacity. This solution may also have little to no impact on table performance and/or availability and may be implemented while executing production workloads with very little downtime or without any downtime as the data is ingested.

The solution may be used to import large amounts of data (e.g., petabytes) from the legacy database system and into new data tables and/or existing data tables in the new database system without impacting production traffic and without the need to build and maintain servers to build and shuffle data back and forth. Once imported, data can be queried (and updated) across primary and secondary indexes without complex migrations or database downtime.

The solution may provide several features for the end users. In some aspects, the solution may provide no impact on live application traffic. For example, the availability and performance of live application traffic may not be impacted by import requests. This may include traffic on the base table as well as its artifacts such as indexes and global table replicas. This may also include traffic for control plane operations (e.g., Update Table). In addition, live application traffic with pathological hot keys may suffer from limited impact due to limitations on the peak throughput of a partition. In some aspect, the solution may not consume customer capacity. For example, using this solution, an import request may not consume customer capacity (e.g., provisioned or on-demand). Additionally, or alternatively, with this solution import may not pollute existing customer visible metrics including consumed write capacity to avoid interference with auto scaling settings and alarms. In some aspects, the solution may provide predictable and efficient data import times. For example, the target internal service level agreement (SLA) may be to import 25 terabytes (TB) within an hour. Tables with local secondary indexes (LSIs) may be exempted from this target SLA. In some aspects, with this solution, the speed of data import may be faster than existing solutions (e.g., AWS DATA PIPELINE®). In some aspects, the solution may have predictable and efficient data import prices. For example, imports may be metered on a new, data import specific dimension based upon a size of the data imported. In some cases, an import of 40 gigabytes (GB) to a table with two (non-sparse) indexes and a global table replica may be metered for 240 GB. The price of data import may be cheaper than existing solutions.

Data may be imported from legacy database systems to new database systems in an efficient manner by importing the legacy database backup files to a table in the new database system. For example, the legacy database backup filed may be located in an internal service account location and mapped to a single new database system partition whereas the data in customer provided files can map to any partition in the table. Due to lack of mapping between files and new database system partitions, systems and processes, as described herein, may be used to determine how to partition a table to import the given data.

Further, with regards to handing untrusted customer data, the data in legacy database systems may be produced by a trusted source (e.g., an internal backup service) and may be defined and sanitized for consumption in restores. In bulk data import, data provided by customers may not be trusted to have the service recommended format. As a result, the systems and methods provided herein may be used to handle the untrusted data, protect new database services against malicious inputs and the asynchronous reporting of errors to the customers. For example, with respect to security, data provided from a legacy database system may remain secure within the new database system. As another example, with respect to data integrity, the data imported into the new database system may exactly match the data provided from the legacy database system so that no loss of information during parsing/conversion of various data formats exists. In addition, the imported data may be retrievable using the new database system's read APIs without any loss in information and no valid items may be missed during ingestion. As yet another example, with respect to customer/user integrity, input to bulk-import may be processed and validated asynchronously and may be invalid or mutated by the customer/user while a request is being served. The customer/user may be aware of variants including which files were chosen by import, which items were dropped, item level error codes, and the like. As another example, with respect to predictability, customers/user may perform import tests to determine the amount of time taken to import data and reliably use the performance data for alarming. As yet another example, with respect to scalability, the systems and method described herein may minimize performance bottlenecks allowing for efficient scaling horizontally.

In some aspects, the solution may include a data import system may include at least two APIs for importing data from a legacy database system to a new database system. The APIs may include an import table API for importing data that is located in the legacy database system and a describe import API to query the status of a data import from the legacy database system to the new database system. The import table API may call only non-existent tables and so that customer/user provided parameters may be used to create a new table within an import table request. The new table may be created in-line with the import workflow. In some aspects, during data import, data plane and/or control plane operations may not be performed. In some aspects, the performance of the data import may be independent of specified provisioning. For example, the same performance may be provided for importing 10 TB of data regardless of whether a request is received to create a new table with 10 write capacity units (WCUs) or 10 M WCUs. Based on new database system constraints (e.g., size, schema, attribute lengths, nesting limits etc.), the new database system may report, to monitoring logs, errors encountered due to unparseable files or invalid items as per new database system constraints. The monitoring logs may be emitted to a new log stream in a customers/user account created by the new database system. The log streams may be unique for a given import-id and a customer/user file. In some aspects, the new database system may expect to receive clean data. By-default, the new database system and/or the data import system may cancel the data import if there's a single error across all files. The cancellation of an import means that the ingestion of any new data to the table may stop and the workflow may fail. To allow for a detection of more than one error in their files, the data import system may provide an ability to specify a non-zero error-threshold (max=10K errors).

In some aspects, the data import system may include synchronous acquisition of a table slot in the new database system. For example, unlike restores, the data import system may not lock the table-name in the sync path. Instead, the data import system may acquire the table slot in an async path to avoid the complexity of extending the 2-phase commit framework used in restores. In some aspects, the data import system may utilize a variety of data formats. For example, the data import system may support DDB-Json, DDB-Ion, CSV and Json as data formats. To parse a CSV row into an item for the new database system with typed attributes, all values except primary keys of the base table and GSI as UTF-8 strings may be used and mapped into the new database system string types. As another example, JSON may not have the same rich specific type annotations that the new database system JSON or Ion does, and a result, the legacy database service JSON and structured types may be mapped to infer a corresponding new database system type. Table 1 illustrates a mapping between a legacy database service JSON format and a new database service JSON format.

TABLE 1

|   | Json Data Type | DynamoDB Data Type |
|---|---|---|
| 1 | string | S |
| 2 | numbers | N |
| 3 | boolean | BOOL |
| 4 | null | NULL |
| 5 | array | LIST |
| 6 | object | MAP |

Table 2 illustrates a customer experiences for invalid input scenarios.

TABLE 2

| Input | Customer Experience |
|---|---|
| 1 Customer provides a file containing invalid content, e.g. rithger9438qrjqiwjiewqjf/KLAFDKSDOFP'[' | Skip the file, emit error log, increase the error counter by 1. |

TABLE 2-continued

| Input | Customer Experience |
| --- | --- |
| 2 The file contains a mix of valid records and invalid content, e.g.<br>{"Item":{"name":{"S":"student-190"}}}<br>{"Item":{"name":{"S":"student-8"}}}<br>{"Item":{"name":{"S":"student-95"}}}<br>qrujqeffa'fasdlfaosd'fpasfdasd;flkasjdksda amsavkasjdfpoaefjpwe'ridfsjsdkrwjr934uipoffkdf;adv'/Z/P<br>{"Item":{"name":{"S":"student-256"}}} | Put 3 items , skip the file, increase error counter by 1, move on. |
| 3 Valid JSON but invalid according to DDB-Json rules e.g. a string present under N attribute type.<br>{"Item":"a":{"N":"i am a string, should have been a number"}} | Put 3 items , skip the file, increase error counter by 1, move on. |
| 4 Valid DDB-Json but doesn't conform to DDB's Storage Rules. i.e. Cases where customer will receive ValidationException from RR on doing a plain putItem.<br>e.g. Item doesn't contain primary keys, attribute length, exceeds item size limits, exceed nesting limits defined by DDB. etc | Such items will be skipped and the error counter will be incremented by 1. We'll continue to put other items in the file. |

In some aspects, the data import system may utilize error reporting. For example, the data import system may use an error reporting system that utilizes item location contained in a data file and may not contain sensitive information (e.g., item/primary keys). When parsing the import data or import data files, the data import system, via the import control plane device, may encounter errors due to un-parseable files or invalid items. The import control plane device may report the errors to a customer log group/log stream. The log groups/log streams may be created by the new database system in customer's account via FAS credentials. There may be no limit to the number of log streams in an account so a log stream may be created on a per impacted file basis. A sample log stream may include "/db-service/imports/<import-id>/errors/" and "/db-service/imports/<import-id>/errors/<second-file--name>."

By default, the data import system, via the import control plane device may cancel data import in response to receiving a first error across all files of the data import. The import control plane device may stop the ingestion of any new data to the table and may fail the workflow. After cancellation, the import control plane device may keep the table as is which may include partially imported data and may deleted upon a customer/user request. In some aspects, the import control plane device may receive a max-error-threshold value (e.g., max=10K) so that import control plane device may allow the data import to continue until a total number of detected errors reaches the max-error-threshold value. This may allow customers to discover a maximum number of errors without restarting their data import after fixing files. Each import worker may checkpoint the errors seen in the files being worked upon by it. In some aspects, an import control plane device aggregator may aggregate the errors across all import workers and trigger cancellation when the error threshold is breached.

FIG. 1 illustrates an example data import system 100 according to some aspects. As shown in FIG. 1, the data import system 100 may include a customer device 102, a request router (RR) 104, management service device 106 (e.g., backup restore management service (BRMS)), a CDP control plane device 108, a customer bucket 110, a new database system control plane 112, an import control plane device 114, customer logs 116, and a plurality of storage nodes 118.

In aspects, the CDP control plane device 108, may receive a request from the request router (RR) 104 of a new database system (e.g., to initiate data import operations to import data from a legacy database system to the new database system. For example, the RR 104 may receive a request to initiate data import operations from a customer/user device 102. Upon receiving the request, the RR 104 may authorize the request and acquires FAS credentials to allow access to various customer resources. After authorizing the request, the RR 104 may transmit the request to a management service device 106 (e.g., a CDP control plane device front end service). The management service device 106 may host business logic for the request (e.g. parameter validations, idempotency etc.) and may forward the request to the CDP control plane device 108 for asynchronous execution. In some aspects, the requested table name may not be reserved in a synchronous execution path. The reservation of the table name and table limits may be performed in an asynchronous execution path.

The CDP control plane device 108 may validate the required permissions for customer resources and scan the data files for import under a given prefix (e.g., an S3® prefix) using the FAS credentials. The CDP control plane device 108 may fail the request if the permissions are not valid or the data files for import under the prefix exceeds the service defined limits (e.g. number of files/size).

The CDP control plane device 108 may request the new database service control plan device 112 to acquire the table slot and create a new table. The table provisioning may be selected based on the volume of the data being imported/ingested and may be independent from a customer/user specified throughput allowing for the data import's performance to be independent of the customer/user specified throughput. In some aspects, the table may be created with a flag indicating the RR 104 to reject any data plane requests while the import is going on. The CDP control plane device 108 may submit the jobs for the customer files to initiate import through the new database system.

The CDP control plane device 108 may direct the new database system to stream the import data (e.g., the customer provided files) and converts, in-memory, the format of the import data from a format associated with the legacy database system to a format associated with the new database system. The converted import data may be subsequently inserted directly into the table using an API of the respective storage node.

The import control plane device 114 may report any errors or item level validation failures (e.g. schema mismatch/size constraints etc.) found in the import data while parsing the file or item level validation failures are reported to a newly created customer/user log (e.g., a provider network health or other monitoring service). The data import system may be responsible for reporting the errors and continuously check-pointing the error-count to its metadata table. The import control plane device may aggregate the total errors for a given data import and trigger a cancellation of all data plane jobs if the total errors exceed the customer specified error-threshold. The import control plane device 114 may update the table to the customer specified throughput and remove any importing flags on the table, for example, after completing the import of all the import data. In some aspects, the import data may be marked as completed and the table may be accessible for use.

Figure 2:
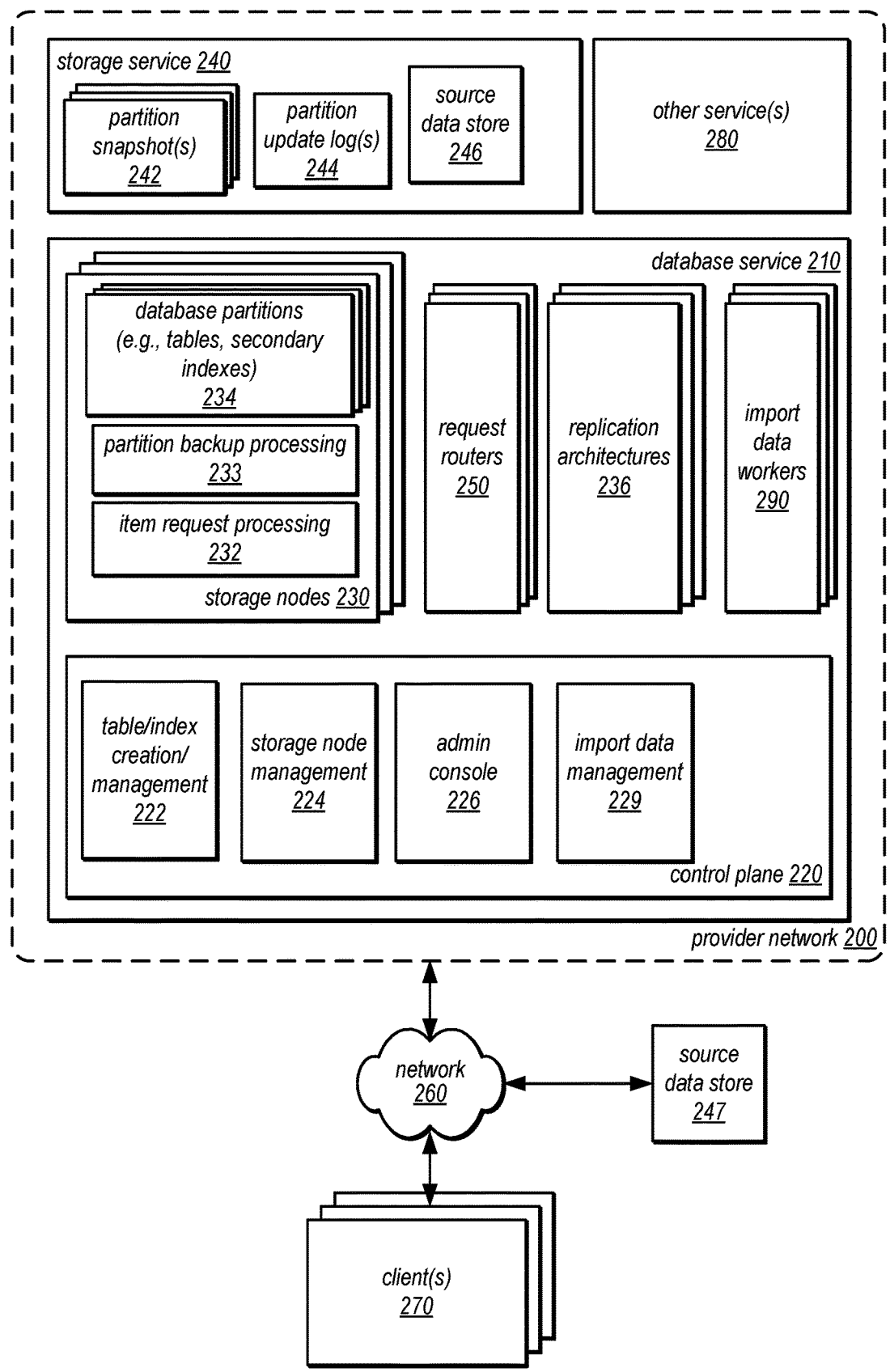
FIG. 2 is a logical block diagram illustrating a provider network offering a database service that may implement verifying performance of different replication techniques for secondary indexes, according to some embodiments.

FIG. 2 is a logical block diagram illustrating a provider network offering a database service that may implement data import from a source data store according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1700 described below with regard to FIG. 17), needed to implement and distribute the infrastructure and storage services offered by the provider network 200. In some embodiments, provider network 200 may implement various computing resources or services, such as import data system 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 17 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Import data system 210 may implement various types of distributed database services, in some embodiments, for storing, accessing, and updating data in tables hosted in a database. Such services may be enterprise-class database systems that are highly scalable and extensible. In some embodiments, access requests (e.g., requests to get/obtain items, put/insert items, delete items, update or modify items, scan multiple items) may be directed to a table in import data system 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, import data system 210 may provide a RESTful programmatic interface in order to submit access requests (e.g., to get, insert, delete, or scan data). In some embodiments, a query language (e.g., Structured Query Language (SQL)) may be used to specify access requests.

In some embodiments, clients 270 may encompass any type of client configurable to submit network-based requests to provider network 200 via network 260, including requests for import data system 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database associated with import data system 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of import data system 210 may be implemented within provider network 200 (e.g., applications hosted on a virtual compute service).

In some embodiments, clients of import data system 210 may be implemented on resources within provider network 200 (not illustrated). For example, a client application may be hosted on a virtual machine or other computing resources implemented as part of another provider network service that may send access requests to import data system 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the import data system 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network

260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Import data system 210 may implement request routers 250, in some embodiments. Request routers 250 may receive and parse client access requests, in various embodiments in order to determine various features of the request, to parse, authenticate, throttle and/or dispatch access requests, among other things, in some embodiments. Import data system 210 may implement different import data operations architectures 290*a*, 290*b*, and so on, as described herein, which may handle bulk import of data from a source data store to a target database, identifying storage nodes of target databases, identifying partitions of data files, reserving computing resources at storage nodes for bulk import of data, initiating import for data files to a target database through storage nodes, and various other operations to implement bulk import of data, as discussed with regard to FIG. 1 and below with regard to FIGS. 3-17.

In some embodiments, import data system 210 may implement control plane 220 to implement one or more administrative components, such as automated admin instances or nodes (which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Administrator console 226 may allow system administrators to interact directly with import data system 210 (and/or the underlying system). In some embodiments, the administrator console 226 may be the primary point of visibility and control for import data system 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with storage nodes 230 to initiate the performance of various control plane operations, such as moves of table partitions, merges of table partitions, splits of table partitions, update tables, delete tables, create secondary indexes, etc In some embodiments, control plane 220 may include a node recovery feature or component that handles failure events for storage nodes 230, propagation architectures 290 and request routers 250 (e.g., adding new nodes, removing failing or underperforming nodes, deactivating or decommissioning underutilized nodes, etc.).

Various durability, resiliency, control, or other operations may be directed by control plane 220. For example, storage node management 224 may detect merge, split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (e.g., without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table/index creation and management 222 to manage the creation (or deletion) of database tables and/or secondary indexes hosed in database service 210, in some embodiments. For example, a request to create a secondary index may be submitted via administrator console 226 (or other import data service 210 interface) which may initiate performance of a workflow to generate appropriate system metadata (e.g., a table identifier that is unique with respect to all other tables in database service 210, secondary index performance or configuration parameters, and/or various other operations for creating a secondary index as discussed below). Backup management 228 may handle or manage the creation of backup requests to make copies as of a version or point-in-time of a database, as backup partitions 242 in storage service 240 which may be used to perform an offline build of a replicated data set like a secondary index.

Control plane 220 may implement import data management 229 which may perform various techniques to identify storage node and data partitions, reserve computing resources, and initiate data import as described herein. In some embodiments, an import data management 229 may receive a request to import one or more data files and/or one or more data items from a source data store 246 or source data store 247 (e.g., a legacy database system) to a target database 248 (e.g., a new database system). In some aspects, the request to import the one or more data files from the source data store 246 or 247 to the target database 248 hosted by the database service includes a request to import the one or more data files to an existing data table. For example, a table may be present in the target database 248 and a request to store additional data files and/or additional data items in the table present in the target database 248 may be received. In some aspects, the request to import the one or more data files from the source data store to the target database 248 hosted by the database service includes a request to import the one or more data files to a new data table. For example, a new table may be created in the target database 248 for storing data files and/or data items associated with the request to store data files and/or data items in the target database 248. In some aspects, the source data store such as the source data store 246 may be hosted within a provider network 200 of the target database 248. In some aspects, the source data store such as the source data store 247 is hosted outside a provider network 200 of the target database 248.

The import data management 229 may identify one or more storage nodes that host the target database to store the one or more data files. In some aspects, the one or more storage nodes may include a respective token bucket for controlling an import data rate through the respective storage node. In some aspects, the import data management 229 may allocate one or more storage nodes of the target database 248 for storing the one or more data files and/or the one or more data items from the source data store 246 or 247 in response to or responsive to receiving a request to import one or more data files and/or one or more data items from the source data store 246 or 247 to the target database 248.

The import data management 229 may identify one or more partitions of the one or more data files according to an import throughput rate for importing the one or more data files into the target database using the one or more storage nodes. In some aspects, the import data management 229 may preprocess the one or more data files and/or the one or more data items from the first database system to identify one or more data file partitions according to a threshold throughput rate or import throughput rate for importing the one or more data files to the target database using the one or more storage nodes. For example, the identification of the one or more data file partitions according to a threshold throughput rate for importing the one or more data files to the target database using the one or more storage nodes may be based on the allocation of the one or more storage nodes of the target database for storing the one or more data files from the source data store. In some aspects, the import data management 229 may preprocess the one or more data files and/or the one or more data items from the source data store to generate one or more secondary base files in the target database to receive the one or more data files. In some aspects, the import data management 229 may preprocess the one or more data files and/or the one or more data items from the source data store in response to or responsive to receiving a request to import one or more data files and/or one or more data items from the source data store to the target database.

The import data management 229 may reserve, at the one or more storage nodes, a first portion of computing resources at the one or more storage nodes to import the one or more data files. The reservation of the first portion of computing resources may permit the import throughput rate of the one or more data files through the one or more storage nodes while maintaining a second portion of the computing resources at the one or more storage nodes to support client access to the target database at an access throughput rate through the one or more storage nodes.

The import data management 229 may initiate import of the one or more data files from the source data store to the target database through the one or more storage nodes according to the identified one or more partitions of the one or more data files at the import throughput rate.

The import data management 229 may detect a usage of an additional portion of computing resources in addition to the first portion of computing resources and the second portion of computing resources, and, may adjust an allocation of computing resources in response to detecting the usage of the additional portion of computing resources. For example, the additional portion of computing resources may support client access to at least one of one or more global secondary indexes or one or more global tables. In some aspects, adjusting the allocation of computing resources may include increasing a total quantity of available computing resources to accommodate the first portion of computing resources, the second portion of computing resources, and the additional portion of computing resources.

In some aspects, the import data management 229 may detect a usage of an additional portion of computing resources in addition to the first portion of computing resources and the second portion of computing resources, and, may identify one or more data file partitions associated with the one or more data files to maintain at least one of the additional portion of computing resources or the second portion of computing resources.

In some embodiments, database service or an import data system 210 may also implement a plurality of storage nodes 230, each of which may manage one or more partitions of a database table or secondary index on behalf of clients/users or on behalf of import data system 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in import data system 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model).

In some embodiments, import data system 210 may provide functionality for creating, accessing, and/or managing tables or secondary indexes at nodes within a multi-tenant environment. For example, database partitions 234 may store table item(s) from multiple tables, indexes, or other data stored on behalf of different clients, applications, users, accounts or non-related entities, in some embodiments.

Different models or formats for storing data for database tables in import data system 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s) and version attributes, in some embodiments. In some embodiments, the tables maintained by the import data system 210 (and the underlying storage system) may have no pre-defined format other than their reliance on the primary key.

Metadata or other system data for tables may also be stored as part of database partitions using similar partitioning schemes and using similar indexes, in some embodiments.

Import data system 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by import data system 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by import data system 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Import data system 210 may include support for some or all of the following operations on data maintained in a table (or index) by the service on behalf of a storage service client: perform a transaction (inclusive of one or more operations on one or more items in one or more tables), put (or store)

an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the import data system 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition snapshots 242 as backups. Storage service 240 may implement striping, sharding, or other data distribution techniques so that different portions of a partition backup 242 are stored across multiple locations (e.g., at separate nodes). In various embodiments, storage nodes 230 may implement partition backup processing 233 to store partition snapshots 242 (e.g., by storing a copy of a partition 234 as of a point-in-time as a snapshot object 242 in storage service 240. In at least some embodiments, update logs 244 (e.g., created by updates for database partitions 234 by item request processing 232) may be stored as objects in storage service 240.

Figure 3:
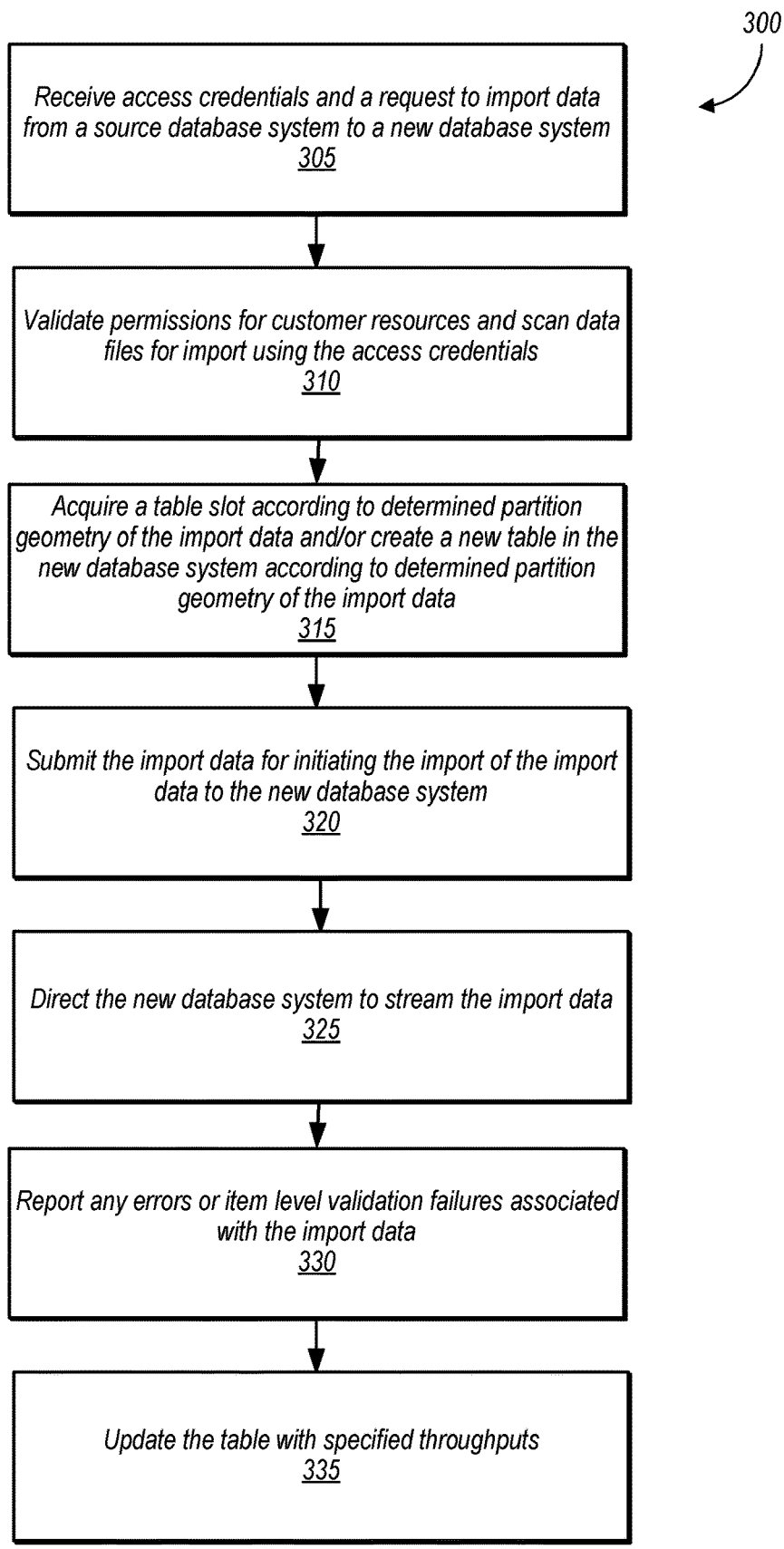
FIG. 3 is an example method of importing data according to some aspects.

FIG. 3 is an example method 300 of importing data according to some aspects. The method may utilize one or more devices or system as described herein including for example the data import system 100 described and illustrated in FIG. 1. At step 305, the data import system, via a control plane device, may receive a request from a request router (RR) of a new database system (e.g., to initiate data import operations to import data from a legacy database system to the new database system. For example, an RR may receive a request to initiate data import operations from a customer/user. Upon receiving the request, the RR may authorize the request and acquires FAS credentials to allow access to various customer resources. After authorizing the request, the RR may transmit the request to an import control plane device front end service (hereinafter "management service"). The management service may host business logic for the request (e.g., parameter validations, idempotency, etc.) and may forward the request to the import control plane device for asynchronous execution. In some aspects, the requested table name may not be reserved during the step. The reservation of the table name and table limits may be performed in an async path.

At step 310, the data import system, via the control plane device, may validate the required permissions for customer resources and scan the data files for import under a given prefix using the FAS credentials. The import control plane device may fail the request if the permissions are not valid or the data files for import under the prefix exceeds the service defined limits (e.g., number of files/size).

At step 315, the data import system, via the control plane device, may request the new database service control plan device to acquire the table slot according to determined partition geometry of the import data and/or create a new table according to determined partition geometry of the import data. The table provisioning may be selected based on the volume of the data being imported/ingested and may be independent from a customer/user specified throughput allowing for the data import's performance to be independent of the customer/user specified throughput. In some aspects, the table may be created with a flag indicating the RR to reject any data plane requests while the import is going on.

At step 320, the data import system, via the control plane device, may submit the jobs for the customer files to initiate import through the new database system. At step 225, the data import system, via the control plane device, may direct the new database system to stream the import data (e.g., the customer provided files) and converts, in-memory, the format of the import data from a format associated with the legacy database system to a format associated with the new database system. The converted import data may be subsequently inserted directly into the table using an API of the respective storage node.

At step 330, the data import system, via the control plane device, may report any errors or item level validation failures (e.g., schema mismatch/size constraints etc.) found in the import data while parsing the file or item level validation failures are reported to a newly created customer/user log. The data import system may be responsible for reporting the errors and continuously checkpointing the error-count to its metadata table. The import control plane device may aggregate the total errors for a given data import and trigger a cancellation of all data plane jobs if the total errors exceed the customer specified error-threshold.

At step 335, the data import system, via the import control plane device, may update the table to the customer specified throughput and remove any importing flags on the table, for example, after completing the import of all the import data. In some aspects, the import data may be marked as completed and the table may be accessible for use.

Bulk import may allow customers to bulk import legacy database system files into an existing table or file in a new database system. In some aspects, data may be imported to an existing file or table in the new database system. During preprocessing and before exporting the data from the legacy database system, the data file or table to be imported may be split to ensure an adequate amount of provisioning on the table. This pre-splitting will allow the data import system to stay decoupled from provisioning settings and/or table partitioning.

After splitting the data or table, the ingestion to the table will be done such that live traffic (e.g., additional data) on the file or table experiences no impact due to import traffic. The data import system may rely on split-for-heat to solve the cases where importing data traffic cannot make progress because a customer's traffic is consuming 100% partition capacity. The data import system may protect the import data traffic while maintaining little to no impact on the live traffic. In some aspects, the data import system may rely on a shared token bucket and provide the best possible customer experience.

For example, a customer may be consuming a first traffic data rate (X) (e.g., in WCU/sec) so that a data import may consume tokens for a token bucket nearest to 1000 minus the first traffic data rate (e.g., 1000-X). Additionally, the data import system may not ramp-up and back-off very frequently and after a back-off phase, the data import system may return to a state where the data import system is consuming maximum available tokens. With this approach, it is possible that if customer is driving traffic at maximum throughput rate of the partition the import data traffic may starve. The data import system may rely on split-for-heat to eventually split the partitions such that both the workloads may operate independently. The core idea behind protecting the data rate availability is that with standard configuration of SDK retries the requests should eventually go through and customers may see higher latencies in their applications but their availability will remain protected. This is motivated from the standard pattern of giving best customer experience in various fault scenarios across distributed systems like splits/no master scenarios/cache invalidations and the like. The public JAVA® SDK for new database system may use an exponential backoff for throttles with up-to 10 retries each having a backoff between (500 ms, 2000 ms). Thus, the data import system may have about 20 seconds before customers start seeing throttles on their application side metrics. With a 20 second buffer duration, the data import system may have 20 seconds to drop our traffic to 0%. Thus, a customer throttle for one second may cause a drop in traffic by 5% and further data rate throttles. If a customer continues to drive peak rate then the data import system may back-off our traffic to 0% within 20 seconds.

In some aspects, a new token bucket on SN may be used which aims at consuming spare capacity on a given partition without interfering with customer's live traffic. Today, each LP holds up-to 30 seconds worth of base table writes and informs the base table partition to start throttling the incoming writes beyond that. This information is sent by the LP to its base table partition via periodic heartbeats. The typical reason for filling up these buffers is either due to an under provisioned GSI or a skewed data distribution on the index partitions. For Bulk Import, we can impact customer's live traffic on the base table if the underlying GSI doesn't have sufficient number of partitions to handle import's traffic or if the bulk-import's traffic is skewed. The following two options talks about how we can avoid this. Today, LogPropagators admit requests to the GSIs by consulting customer's provisioning settings (via GAC). For all the below options, we'll have to change this behavior and instead rely on underlying storage node's capacity and admit the puts to the index partition via the shadow token bucket.

Figure 4:
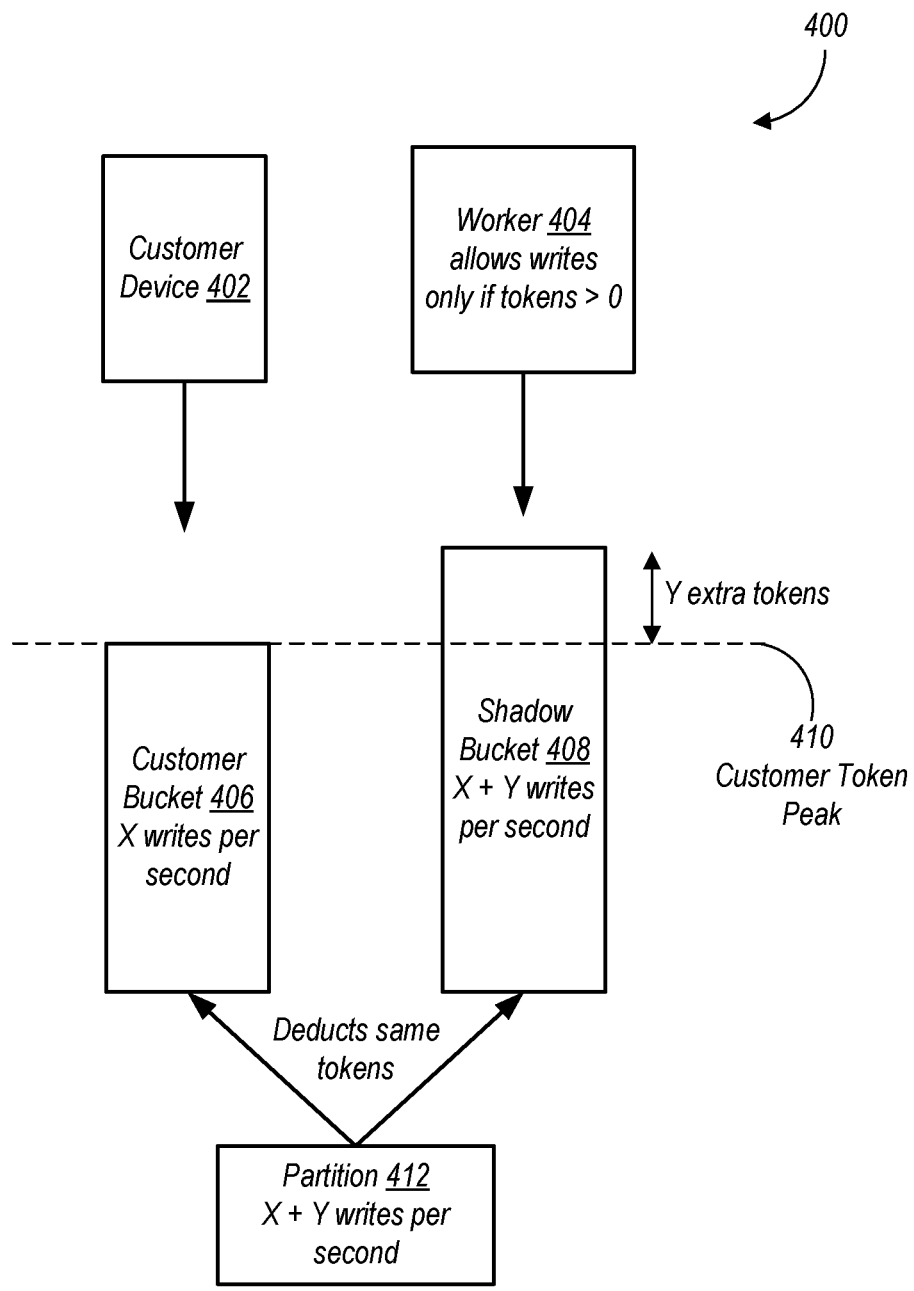
FIG. 4 is an example illustration of a data import system including a shadow token bucket according to some aspects.

As described herein, the data import system may import write on storage nodes via a new shadow token bucket. FIG. 4 is an example illustration of a data import system 400 including a shadow token bucket according to some aspects. The shadow token bucket may allow import writes to consume an average remaining capacity of the token bucket used to admit customer requests. For example, if a customer using writes average approximately 400 write capacity units (WCUS), then import writes may receive 600 WCUS assuming the peak write rate on a particular storage node is 1000 WCUS. Import writes may consume tokens from the new shadow token bucket, but not from the customer peak bucket. Furthermore, import writes may only be admitted if there is available capacity in the new shadow token bucket. However, when a customer write is admitted (e.g., tokens are deducted from the customer peak bucket) the same amount of tokens are deducted from this new shadow token bucket regardless of the capacity of the bucket (e.g., the shadow token bucket can go negative). When the shadow token bucket goes negative, the existing control loop may begin to back off in response to throttles, while customer writes continue to be admitted. In some aspects, the shadow token bucket may be given a buffer allowing for some data import to occur even when customers writes consuming the full capacity of the customer peak bucket.

In some aspects, selective back-pressure may be applied on the delegated writer. For example, an online indexer, performing online indexing, may try not to impact the live writes while index is being backfilled. The online indexer may back off the backfill process on a storage node when the base table partition sees that the buffer size of LP connected to it is >30%. Similarly, the traffic may be throttled from bulk-import/delegated-writer on the base table if the LP's buffer size is >X % where X is a relatively low number (e.g., zero or close to zero). This has worked well in production for online indexing and we'll have to simulate the online indexer's back-pressure logic on bulk-import to see if this can be a good enough v1. The simulation will aim at showing whether import can back-off fast enough before the LP buffer fills up further. The back-pressure criteria may be further enhanced in the future once LPs have moved to LogService wherein the truncation point on the storage node may not have to be held. The back pressure may be selectively applied to the bulk-import (a delegated writer) based on num-pending-sys-writes information sent by a LP and these un-replicated writes can be worked upon via the LPs without worrying about truncation point. The back-pressure may be required even in case of log service to avoid the problem of infinite catchup where import continues to generate more traffic than the consumption rate on indexes. In some aspects, buffers may be skipped and direct puts may be implemented on index partitions from import. For example, the data import system may directly put the GSI projected items to the index partitions along with putting data to base table partitions.

In some aspects, a remote region may not be able to replicate to an importing region because of write contention with bulk-import in the importing region. In this case, the replicator may experience a write contention due to bulk-import and may lead to an increase in replication delay (today, avg. delay is <500 ms). A high priority may be given to the incoming writes from the remote region using the shadow token bucket. Some or all the writes from remote-region by replicator may be admitted in the regular peak bucket providing a signal of when to throttle import. In some aspect, live customer writes in a remote region may be impacted because of replicated bulk-import traffic from the importing region. This scenario can happen when bulk-import has generated more traffic in a region as compared to a remote region because of difference in partitioning of the two regions. Due to this increased bulk-import traffic, the remote region may experience a surge in its traffic as well and potentially exhaust the tokens on SN in the replicating region causing an impact on the live customer writes. In this case, the importing region's replicator while putting data to the remote region may ensure that it puts the bulk import writes in the shadow token bucket. This information has to be communicated to replicators via the log entries. This may ensure that the live customer writes may always get a priority over the replicated import writes. However, this may cause further increase in backlog on the replicator. To avoid this, all the replica regions of a global table may have a same partition geometry as the importing region and/or import may have to back off if replication delay on a per-base table partition has breached by a certain threshold amount.

In some aspects, direct puts may be implemented on index partitions from import. For example, the putters along with writing to the base-table partition will separately write the GSI projected item to the index partition of all GSIs of the given table. The put to the GSI partitions from Import will be done after the put to the base table has succeeded and any conflicts on a given GSI item will be resolved using TSO. In order to ensure no availability impact on the base table due to GSI backpressure, these puts may be admitted from import via the shadow token bucket. This may be resolved by removing the server side buffering between storage nodes and LPs.

In some aspects, a storage node may have a fixed size isolated token bucket for data import. For example, import data may transmitted through a storage nodes with a fixed size token bucket (100 tokens) that is completely isolated from a customer's admission control to ensures that import data is not competing with application traffic at any given time. This may provide an assurance that a customer application traffic will not be impacted by traffic generated by background putters from their bulk-import operation and also ensure that data import predictability.

Figure 5:
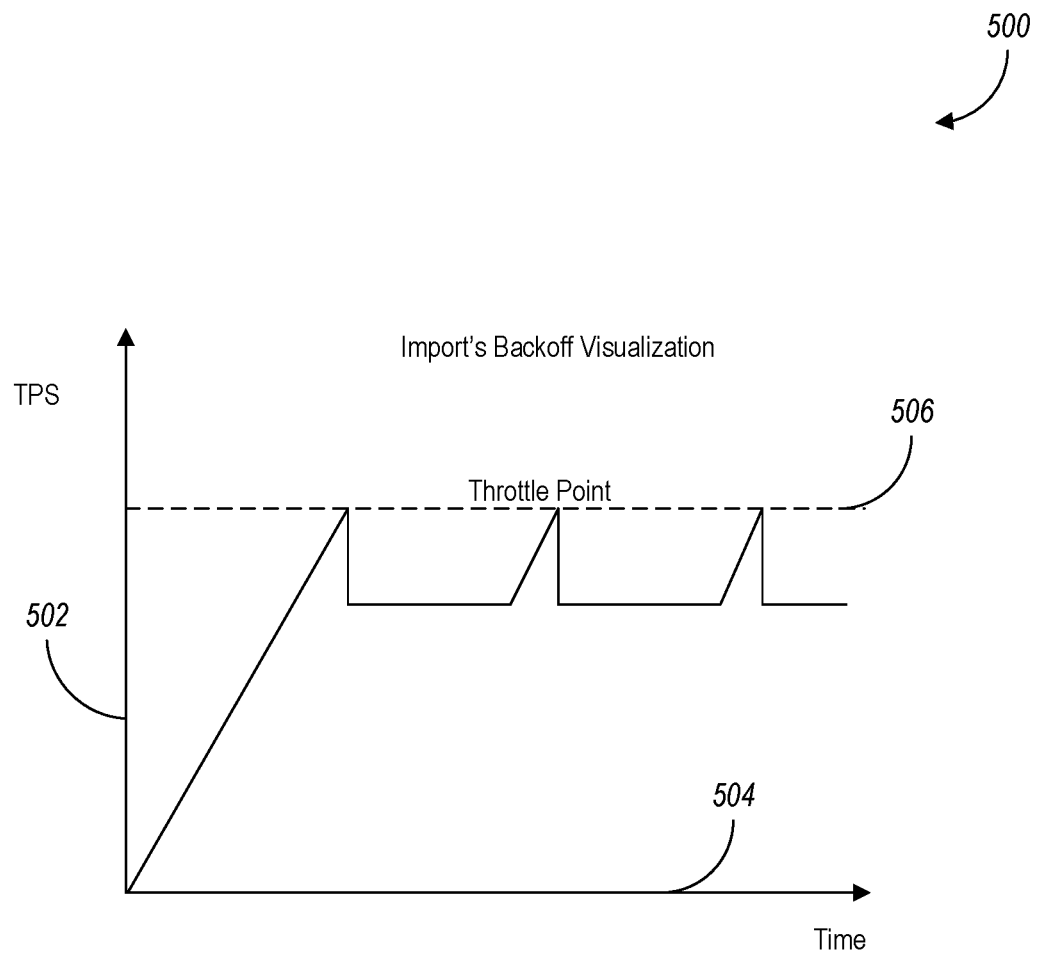
FIG. 5 is an example graph illustrating data import backoff according to some aspects.

FIG. 5 is an example graph 500 illustrating data import backoff according to some aspects. The graph 500 may include a data rate axis 502 and a time axis 504. The data rate of import data may increase to the throttle point 506 and backoff to a percentage below the throttle point 506 and subsequently rise and backoff again periodically with respect to the throttle point 506. For example, the data import system may adjust traffic over time dynamically to protect the underlying storage node(s). The data import system may receive a signal from storage nodes to backoff or reduce a data import rate via exceptions/errors. These throttles/errors may be used as a signal to adjust import traffic by no more than a threshold percentage, for example, 5%. In some aspects, the data import system may aggressively backoff or reduce the import data rate from a storage node and may periodically increase the data traffic to determine that storage node partitions may be under-utilized. In other words, this configuration may allow the data import system to utilize the data rate of import data over time into the new database system to determine the utilization rate of the storage node. The data import system may slowly ramp up the traffic data rate and when reaching a state of throttle or throttle point, may back-off aggressively assuming the import data rate is impacting customer availability.

Figure 6:
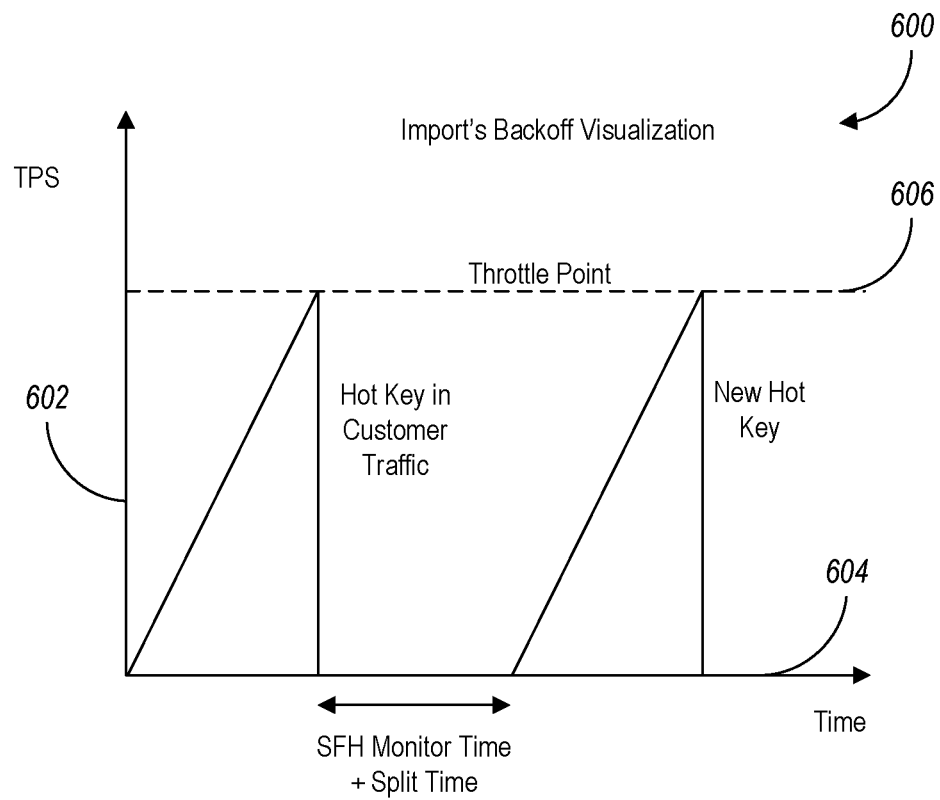
FIG. 6 is an example graph illustrating data import backoff according to some aspects.

FIG. 6 is an example graph 600 illustrating data import backoff according to some aspects. The graph 600 may include a data rate axis 602 and a time axis 604. Using a hot key for customer traffic the data rate may increase to the throttle point 606. Similarly, using a hot key for import data may increase to the throttle point 606. For example, a data import system utilizing bulk import may work on a given table or file by communicating with a small subset of partitions (e.g., two partitions if partition geometry has an average split factor of two). In some aspects, the data import system may utilize bulk import with customer provided tables or files when the data items in these table or files may not have similar mappings such that the data import system may be in communication with all partition in a file or table. Thus, if customer has a hot partition or even a hot key (very nominal case) then some or all bulk import jobs may receive a false signal to slow down creating an under-utilization across the partitions.

Figure 7:
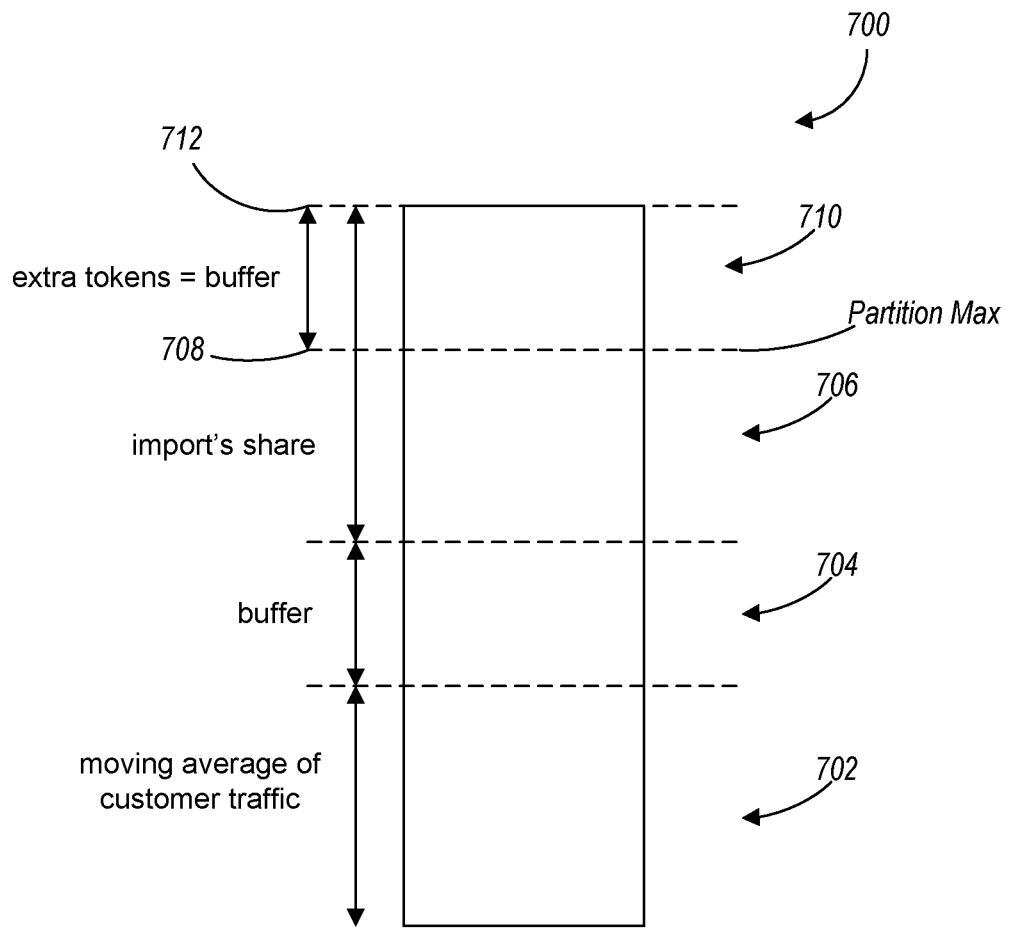
FIG. 7 is an example token bucket according to some aspects.

FIG. 7 is an example token bucket 700 according to some aspects. The token bucket 700 may contain a distribution of tokens for a particular partition and/or storage node. As shown in FIG. 7, the token bucket 700 may include a first set of tokens 702 for customer traffic. The customer traffic may be application traffic associated with a file or a table. In some aspects, the quantity of tokens of the first set of tokens 702 may be variable and estimated based on a moving average of customer traffic. The token bucket 700 may also include a second set of tokens 704 associated with buffering. The token bucket 700 may further include a third set of tokens 706 for importing data to a table or file. The sum of the first set of tokens 702, the second set of tokens 704, and the third set of tokens 706 may provide a partition or storage node maximum 708 associated with the client or customer. In addition, the token bucket 700 may include a fourth set of tokens 710 of extra tokens to manage customer traffic and/or to import the import data to a table or file. The sum of the first set of tokens 702, the second set of tokens 704, the third set of tokens 706, and the fourth set of tokens 710 may provide a partition and/or storage node capability maximum 712 associated with the partition and/or the storage node. A partition may be a fixed capacity resource having, for example, 3000 IOPs or tokens. The data import system may divided these tokens to two clients one of which is higher priority (e.g., customer traffic, application traffic) and the other one is lower priority (data import traffic). The data import system may seek to minimize the disruptions on high priority traffic while permitting low priority traffic.

Figure 8:
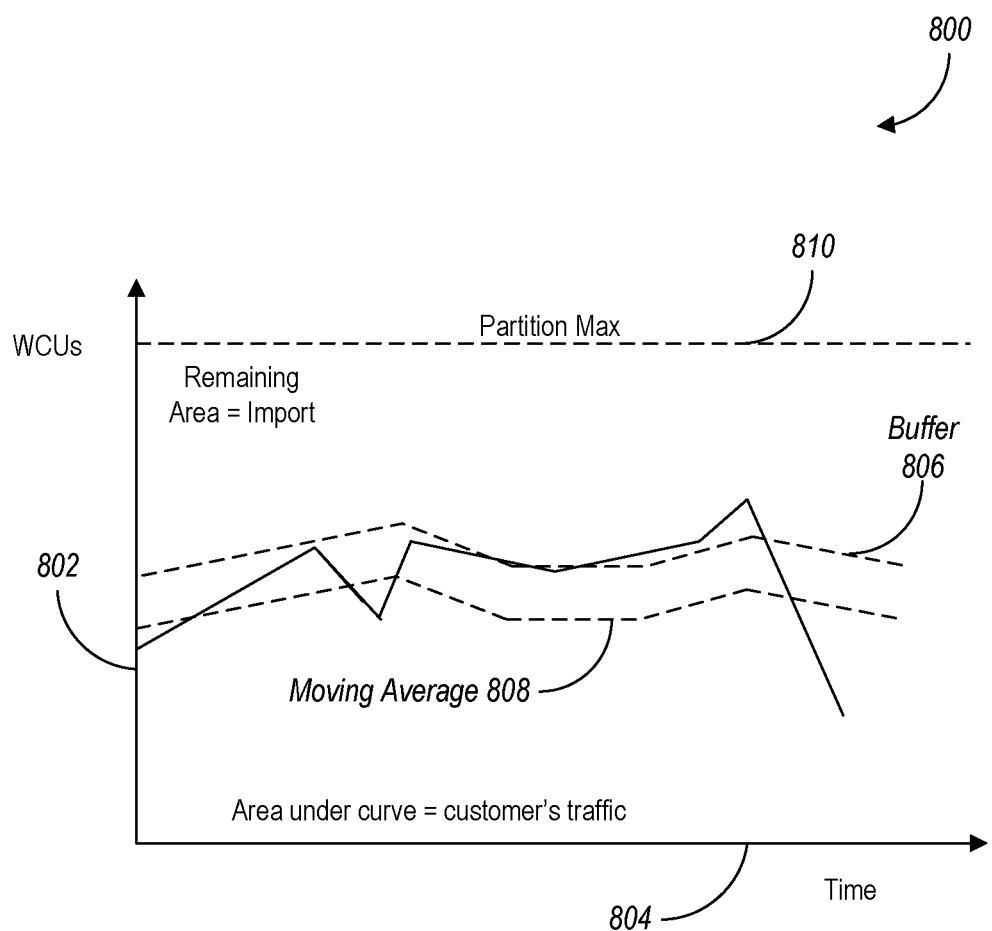
FIG. 8 is an example graph illustrating data import backoff according to some aspects.

FIG. 8 is an example graph 800 illustrating data import backoff according to some aspects. The graph 800 may include a data rate axis 802 and a time axis 804. The graph 800 also includes a buffer curve 808 and a moving average curve 810. The area below each of the buffer curve 808 and the moving average curve 810 may be indicative of customer data traffic. The area above each of the buffer curve 808 and the moving average curve 810 may be indicative of import data traffic. Thus, the area beneath the partition and/or storage node maximum curve 810 may be the sum of the customer data traffic and the import data traffic. For example, a maximum partition throughput value is the maximum throughput value that a partition can support. High priority traffic may be initiated on the partition at a first throughput rate and the traffic may maintain the first throughput rate. In this case, for the data import, the maximum throughput value or tokens allowed would be the different between the maximum partition throughput value and the first throughput rate.

In some aspects, the first throughput rate may not be maintained and instead fluctuate between two throughput rates. For example, if the data throughput rate used at a partition for application traffic is the first throughput rate plus a second quantity of additional tokens, the first throughput rate may be maintained while the second quantity of additional tokens may be throttled to allow for data import. The data import system may use the second quantity of additional tokens as historical information of sub-par throttles to gradually update the import throughput rate. On that note, the data import system may maintain rolling data of sub-par throttles per second for a window of a predetermined time. Upon detecting that the throttles above a threshold in a last second of the predetermined time, the data import system may reduce the throughput rate by a percentage (e.g., 5%). If the data import system detects that sub-par throttle rate has gone down below a certain threshold for all data points of the predetermined time, the data import system may increase the throughput rate of the import data by a percentage or to the maximum throughput value.

One of the underlying aspect in isolating import's traffic from customer's traffic is that split-for-heat may eventually split the partition and will horizontally scale the key range. However, the split-for-heat may not split partitions if the heat received by a partition is moving in a single direction (e.g., scans). Therefore, the data import system may isolate our traffic from customer's traffic in a deterministic manner. For example, the data import system may isolate increasing heat for both base tables and GSIs. In some aspects, the files provided by the customer may have data sorted in an index key and putters are following the same order as present in these files. In some aspects, import's traffic may be split but no throughput is occurring because customer's live traffic is consuming max WCUs while having single directional heat.

To increase the sort key in customer files, the data import system may explicitly perform shuffling in putters. For example, the data import system may buffer X Mb of data from the file and may shuffle it before transmitting the data to the storage node. The data import system may dynamically shuffle rather than doing an explicit collection shuffle. For example, the data import system may have a set which stores the items based on the murmur/sip24 hash of the keys and may provide natural shuffling. Once the buffer has reached X Mb, an import worker may start putting items in the order of this set. However, the above algorithm may also guard against almost-increasing sort key cases. In order to implement this algorithm with split-monitor, the data import system have to buffer >15 minutes (30 mins/2) worth of puts. Because anything less than this will fail the criteria of requiring at-least 50% duration to lie within the median of the 30 minutes data. Since a partition can only ingest 1 MB of data per second this may mean that the data import system may buffer at-least (15*60 seconds)*1 Mb=900 MB worth of data per-put job.

In some aspects, the data import system may divide a single file among various workers and these workers will put the data in the same order. The data import system may split the file if the data import system detects multiple increasing heats in a partition. For example, the data import system may receive a 10 GB file with all items having single hash-key and sorted range keys. The data import system may logically segment the file to 10 parts and have 10 workers working on those 10 parts. The data import system may have 10 different increasing sort keys on the partition. The data import system may choose a small enough segment that even with 1000 WCUs drain speed can meet specified time targets for bulk-import. Consider a general case of increasing sort-key in GSIs, where customer provides a file with all items having same base table hash key as well as same GSI hash-key. Further the items may be sorted on GSI range-key which is a timestamp. In this case, the puts from base-table partition may be place at a single GSI partition and may receive ranges in sorted order only if the data import system writes from a single worker. However, if the data import system writes data from multiple workers in chunks, the data import system may be able to make through split-for-heat criteria of the index partition.

In some aspects, the data import system may isolate non-splitable traffic from data import. For example, the data import system may wait for customer traffic to move out of the partition. For instances, heat on a storage node may be caused by repeated scans and/or a customer's application writing in an increasing sort key. The data import system may read and write traffic differently in their iops token logic and, based on the customer's heat move out of the partition's key range, the data import system may import the import data (e.g., import traffic) to the partition.

As another example, the data import system may provide a shadow token bucket with additional tokens for import writes. For instance, the data import system may allow import writes to burst beyond partition max (e.g., 1000 WCU/sec) by keeping an additional small token bucket (e.g., 100 tokens/sec) which only admits import writes. This way even in the scenarios where customer is consuming 1000 WCUs/sec, the data import system may have splitable samples for monitoring to recommend the partition as a split. Alternatively, the data import system may have modified the monitor to consider import writes as different samples and apply the algorithm separately on them. In some aspect, the new database systems may also have mixed access patterns (e.g., 90% non-splitable and 10% splitable traffic) and the monitor (e.g., an SFH monitor) may have to split such traffic patterns.

In some aspects, the data import system may not touch existing item at all. For example, if bulk-import contains an item with a same primary key as an existing item in the table then the item will not be overwritten. However, this may not be useful for customers who have use case of periodic imports as their items will never get updated. The data import system may provide customers with the ability to specify a conditional expression in the API. This way customers may control the logic of which items should be overwritten and which ones should not be overwritten.

In some aspects, the data import system may overwrite items that were written before a customer provided a timestamp. For example, the data import system may accept a timestamp from a customer representing the timeline beyond which none of the items written/deleted should be modified. If the customer has an item in the table that was written/deleted before this timestamp then, the data import system may overwrite the item. Whereas, if the item was deleted or written after this timestamp then the data import system may not overwrite such an item. Therefore, bulk-import's CX can be visualized as a giant batch-write operation where the data import system may rewrite all items with the same timestamp. This timestamp will be optional and will default to request time. While writing to a live new database system file or table, the data import system may ensure that it is not over writing customer items which have been updated after the bulk-import request was made. This can be achieved by using time stamp ordering feature of storage nodes where items have timestamps associated with each item mutation. The condition to avoid item mutation would be to drop all the items which have been mutated after the bulk-import request. The data import system may specify TSO attribute as the request time in a putItem requests to storage nodes.

In some aspects, the data import system may not have TSO enabled on all new database system files or tables and therefore all the items have null TSO attribute in them. Null TSO may be treated as an item which was mutated in negative infinity time. This property along with TSO not being enabled may cause durability issues (e.g., the data import system may enable TSO on a table at the time of admitting customer's request). Despite of enabling TSO at the request time, some storage nodes may not know about updated states and may persist the mutations during this as null. Now, due to null timestamp for such items all the writes from bulk-import for keys mutated in this time duration may get over written. Therefore, we need to make sure that TSO is enabled on all existing and new database systems files and tables before the data import system launches bulk import.

In some aspects, workload profiles may be an upcoming public new database system feature which may allow customers to independently provision throughput for their multi-tenant workloads within same table. Workload profiles may allow customers to specify a fixed RCU/WCU configuration for each tenant and RR/GAC makes sure that for a given data plane operation belonging to a certain tenant they only refer token buckets of that tenant. Since this may also essentially be a multi-tenant workload on the customer table, the data import system may also have to evaluated workload profiles as a potential solution to solve our problem. However, the current semantics of workload profiles may not be suitable in some cases. For example, the data import system may create a hidden workload profile for import which is only allowed to do 8000 WCUs and customer has already configured 4000 WCUs on their table. A customer may have an imbalance in their schema such that all their data is located on one partition (limited by 1000 WCUs). In this case, both import traffic may essentially start competing against each other despite their individual traffic being lower than their provisioned. It is clear from the above example that a solution may be needed which works at per-partition level (e.g., governance) and not at table level (e.g., GAC). Thus, workload profiles and these solutions may be converged to provide an enhanced multitenant experience for the new database systems.

Figure 9:
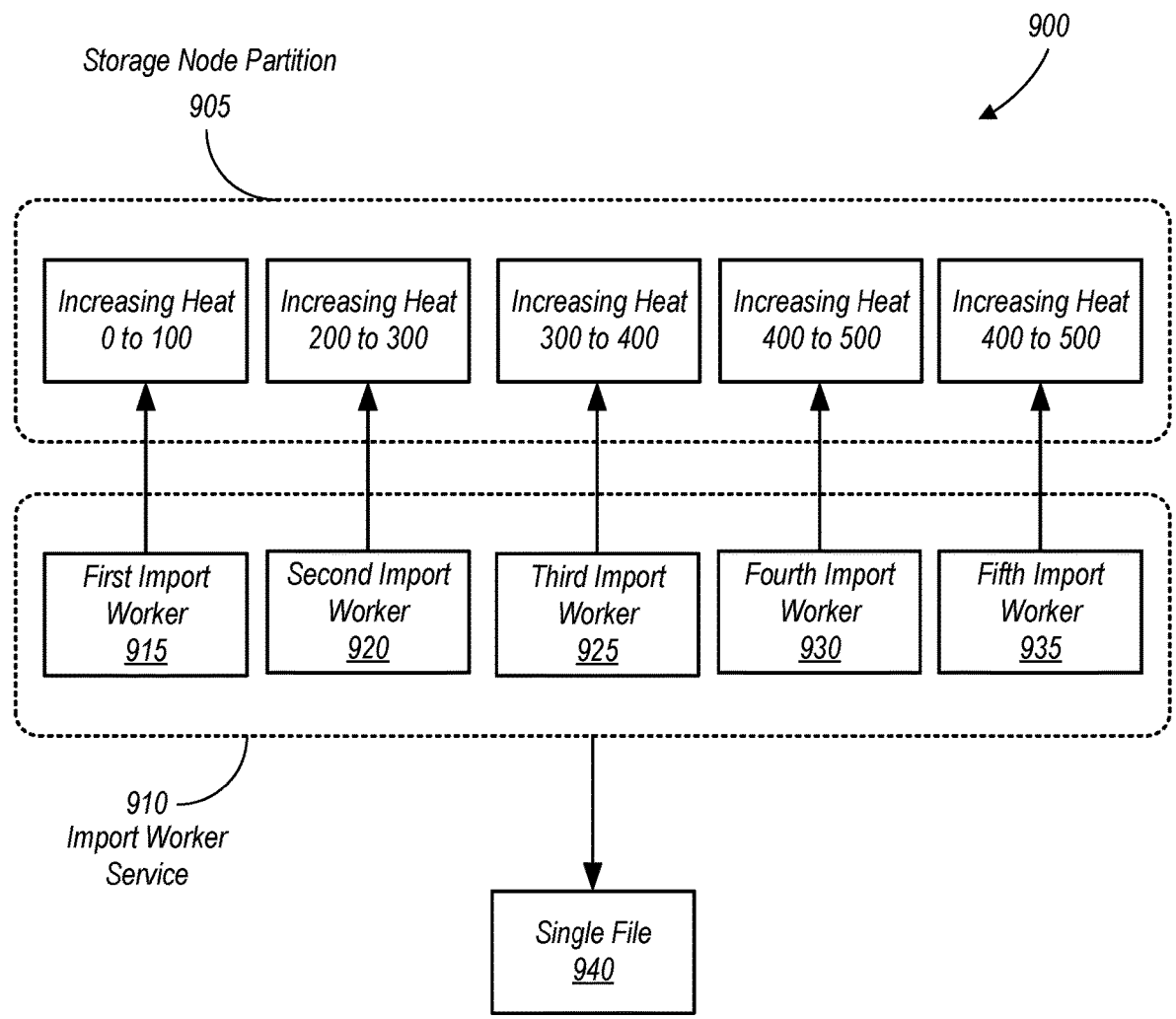
FIG. 9 illustrates an example system for importing import data according to some aspects.

FIG. 9 illustrates an example system 900 for importing import data according to some aspects. As shown in FIG. 9, the system 900 may include a storage node or storage node partition 905 and import worker service 910. The import worker service 910 may include a plurality of import workers including a first import worker 915, a second import worker 920, a third import worker 925, a fourth import worker 930, and a fifth import worker 935. Each of the import workers may associated with an increasing heat. For example, the first import worker 915 may be associated with (e.g., may import) import data with a heat from 0 to 100 WCUs, the second import worker 920 may be associated with (e.g., may import) import data with a heat from 200 to 300 WCUs, the third import worker 925 may be associated with (e.g., may import) import data with a heat from 300 to 400 WCUs, the fourth import worker 930 may be associated with (e.g., may import) import data with a heat from 400 to 500 WCUs, and the fifth import worker 935 may be associated with (e.g., import) import data with a heat from 500 to 600 WCUs. In some aspects, the five workers may be for putting data from a single file having a format of a legacy database system. All the workers may be working on mutually exclusive byte-ranges of a given file. For proving the correctness of the bounded puts solution, these files may contain data in sorter order of index key. As shown above, each worker is writing data in sorted order from a given file.

For example, the first worker 915 may be writing data to storage node partition 1 (0-100) and the second worker 920 may be writing data to storage node partition 2 (200-300). Each of the workers may be writing to a signal storage node partition of a hypothetical key range of [−100, 1000]. At any given point in time, if these workers are writing data in parallel then for every 1-second duration at-least one key for every range of data may be provided as shown in above partition. For every 1-second duration the min-key of the overall traffic may always be within 0 to 100 and the max-key may always be within 500-600. Similarly, since data is being written in multiple sort orders the median of all the "hot seconds" may always lie within 300-400. Thus, as per SFH algorithm, the median of medians will also lie within 300-400. In some aspects, the key parameters of SFH may be as follows: MaxKey=500, MinKey=100, Median=350. Since Median >MinKey and Median <MaxKey for all hot durations (i.e. >50%) the SFH algorithm may always recommend our traffic as a split to AA.

In some aspects, the data import system may sort data. For example, the data import system may use an external merge sort algorithm, where the data import system may initially sort the individual files on a given box. Subsequently, the data import system may have a leader which will stream min of all keys from all followers. This may create bottlenecks for transferring X TB data over the network. In some aspects, the data import system may sort 100 TB (1 trillion records) of data in 23 minutes with ~200 EC2 (i2.8x large) instances.

As another example, the data import system may put data to kinesis shards created based on an index key of a given item. Kinesis may automatically split shards unlike other alternates like using a legacy database system format for sorting. Once data is put onto kinesis stream, the data import system may use a replicator framework to do the puts to storage node.

In some aspects, new database system may starts throttling base table writes if GSI replication is not keeping up with base table writes. This may happen when customers have skewed data in their indexes (e.g., multiple base table partitions are projecting items to a single index partition). In case a customer has a skewed GSI in their bulk-import input, the data import system may potentially impact the live writes on the base table. This is because base table partitions may not send an advance signal to import that GSI is about to run into a problem due to slow drain speed. The outage on the base table in such cases may be for longer durations as the requests from skewed bulk-import will be bottlenecked by the speed of skewed index partitions. The data import system may minimize this impact by backing off the import writes to a given base table partition if GSI buffers for its LP exceeds X %. In some aspects, LPs may periodically detect the buffer size to the base table partitions and may have this information returned to import as a part of putItem response. During the times when import writes have backed-off due to GSI buffer size, the data import system may send enough signal to index partitions to eventually split. This is important because customer's live traffic on GSI may be producing increasing heat and the index partitions may not split and starve import traffic.

Having a reserved set of tokens for import on a storage node may make sure that import maintain progress and signals SFH via its randomized traffic. Further, in order to mitigate the replication delay for live writes, two levels of priority buffers may be used (e.g., implementation wise, this can be same buffer with larger size). The import writes may go to a low queue and customers writes may go to a high queue. Having separate queues for import and customer writes may provide empty slots in the buffer if import's production rate is higher than consumption.

In some aspects, the solution may include a data import system that supports live import with system throughput. For example, the data import system may completely manage the import of data without consuming provisioned or on-demand throughput on a table. The data import system may internally scale the table and determine how much background throughput to consume such that live application traffic is un-impacted and such that the import of data completes within a well-defined, predictable time. Unlike other systems, the data import system may no longer need to scale up provisioned capacity which incurs additional cost, manage scheduling imports during periods of low application traffic, and/or worry about impact to their live application traffic.

As described further herein, to import data, the data import system that supports live import with system throughput may use a variety of technical approaches. For example, the data import system may create a new shadow token bucket at a per-partition level on storage nodes. Additionally, or alternatively, the data import system may create a similar token bucket at a per-table level on a global assembly cache (GAC). However, in some aspects, this technique may cause the data import system to suffer from throttles when import data traffic or data use traffic is skewed towards a single hash key. Additionally, or alternatively, the data import system may delegate operations.

In some aspects, the solution may include a data import system that support live import with user throughput. For example, the data import system may partially manage the import of data. The new database system may consume provisioned or on-demand throughput on the table and associated artifacts such as indexes and global table replicas. The new database system may internally prioritize throughput from customers applications and may use a remaining amount of spare capacity (e.g., at least similar to global tables). The amount of time that may be used to import the data may depend on the specified scaling of the table by updating provisioned throughput via an API (e.g., UpdateTable API), enabling auto scaling, or updating the billing mode for the table to on-demand. In some aspects, if the table is on-demand, a limit increase may be requested for the maximum allowed consumed write capacity per account. If enough capacity is not provisions for the import to complete in a predetermined amount of tie, the data import system may fail the import with an error code indicating that the table or one of its associated artifacts was insufficiently scaled.

As described further herein, to import data, the data import system that supports live import with user throughput may use a variety of technical approaches. For example, the data import system may create a new shadow token bucket at a per-table level on GAC. This approach may protect the customer against table-level throttling, but in some instances, may not protect against throttling caused by import or customer traffic skewed towards a signal hash key. Additionally, or alternatively, the data import system may create an additional shadow token bucket at a per-partition level on a storage node. This approach may protect a customer against both table-level throttling and against throttling caused by importing data or customer traffic skewed towards a single hash key.

In some aspects, the data import system may replicate existing import solutions that customers are familiar with via the introduction of a parameter customers can use to control the WCU consumption of import requests. For example, current data pipelines may allow users to specify a write throughput ratio (e.g., DynamoDBWriteThroughputRatio) which may limit a data import request to a percentage of provisioned capacity for a table. In some aspects, some current data pipelines may not support this for tables with on-demand capacity. As such, a user may be able to specify a maximum write throughput limit which may limit a data import request to a maximum amount of write capacity for a table. A parameter representing an absolute value rather than a relative percentage may be chosen to ensure integration with auto-scaled and on-demand tables. Import traffic may consume provisioned capacity for provisioned tables and may consume capacity against account limits for on-demand tables.

Figure 10:
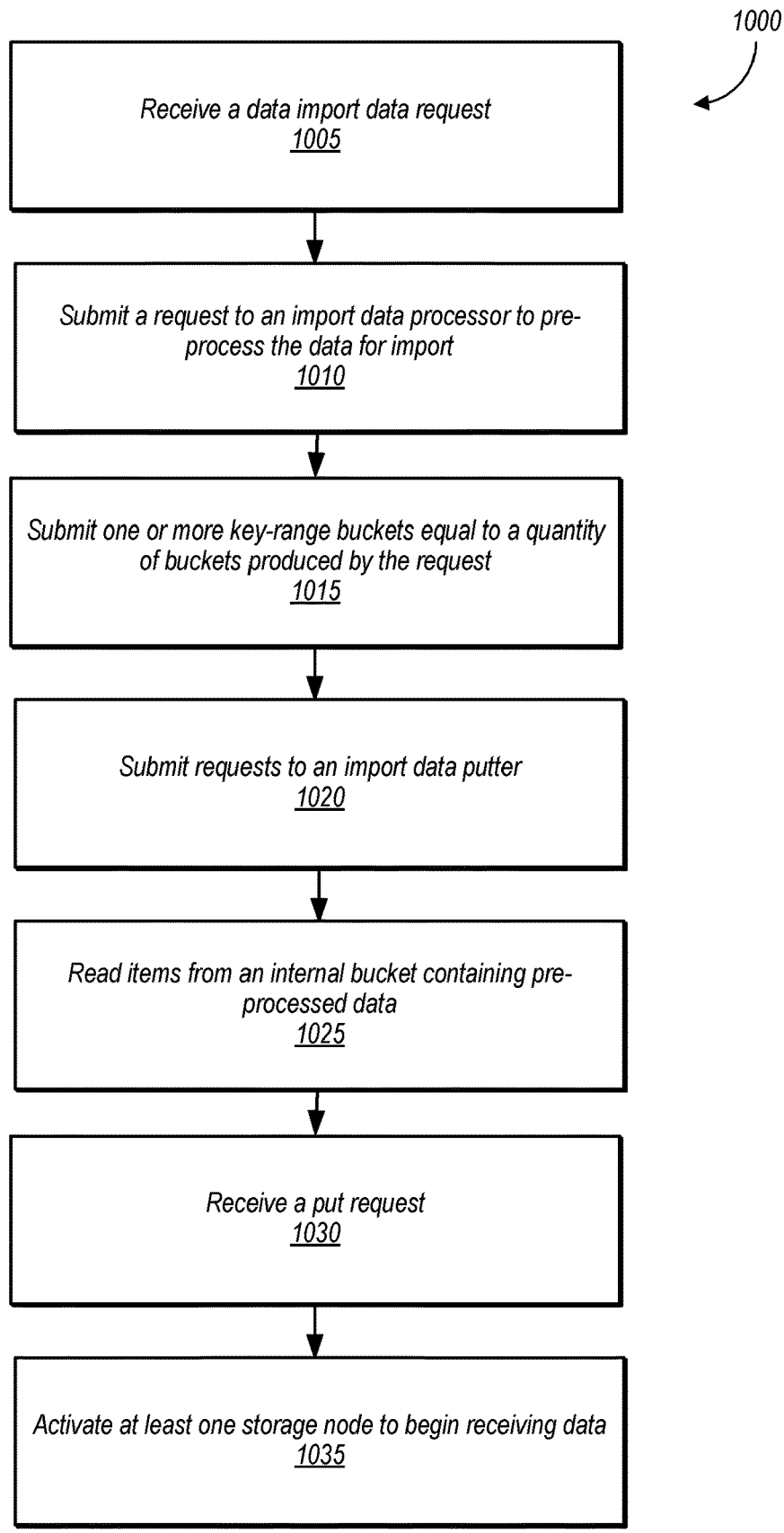
FIG. 10 illustrates an example method for importing data according to some aspects.

FIG. 10 illustrates an example method 1000 for importing data according to some aspects. At step 1005, a data import system, via a request router (RR) may receive a data import request. The data import request may be received from a management console (e.g., CLI® or SDK®). The RR may forward the data import request a management service server. The management service server may enqueue an import workflow with an import control plane (ICP).

At step 1010, the data import system, via the ICP, may submit a request to an import data processor to pre-process the data for import. In response to the data import request, the data import system may generate a series of one or more buckets of the data for the table and associated indexes such that each bucket requires no more than a threshold input/output operations per second (IOPs) for reception (e.g., 100 IOPs). For example, when the threshold IOPS for reception is 100 IOPs, to import 1 TB of data where each item is roughly 500 bytes, the total throughput of the data import may be expected to be 1.7 MM IOP/s and the output of the request may produce 17,000 buckets.

At step 1015, the data import system, via the ICP, may submit one or more key-range buckets equal to the quantity of bucket produced by the request (e.g., 17,000 key-range buckets) to an administrator system (e.g., Auto Admin), via an object (e.g., an S3 object) with the estimated IOP/s calculation equal to the threshold IOPs per bucket (e.g., 100 IOPs per bucket). For each existing partition of the table, the system administrator may submit a request to a relevant storage node to allocate the necessary IOPs for data import writes. For partitions where the storage node indicates that the storage node does not have sufficient IOPs to spare without impacting customer traffic, the data import system, via the administrator system may recursively split and/or move the partition. In some aspects, the data import request may include a request to update provisioned capacity or a billing mode. In this case, the data import request may not be blocked and the administrator system may process both requests.

At step 1020, the data import system, via the ICP may submit requests to an import data putter (IDP) such that there is a 1:N relation between import jobs and the partitions the processor for that job ingests data to.

As step 1025, the data import system, via the IDP, may read items from an internal bucket (e.g., an internal S3 bucket) containing the pre-processed data. For each item, the IDP may submit a put item request to the relevant storage node. In response to each put item request, the storage node may provide an IOPs value that the IDP may use to control the data import rate (e.g., to limit the data import rate). The IDP may receive the initial IOPs value via a request to subscribe the partition prior to initiating data import.

At step 1030, the data import system, may receive a put request. The put request may be provided to each storage nodes to ensure that the respective storage node is prioritizing customer requests (e.g., non-data import traffic) such that live application traffic is not impacted as a result of an on-going data import, including global system integrator (GSI) backpressure.

At step 1035, at least one storage node of the data import system may be activated to begin receiving data import. Subsequently, the storage node may receive put-item requests from the IDP with decreasing IOPs values to control the data import rate. If the inflow of the import data to the storage node is sustained such that storage node cannot respect the IOPs rate originally allocated to the IDP then the storage node may report the partition as a candidate for split and/or move for data import reception.

In some aspects, an alternate sort key may be maintained for a given partition key value via a local secondary index. For local secondary indexing, at least some or all items under a given hash key value may be hosted by a single partition. If data import of many data items are attempted to a specific hash key value then the time to import that data may be limited by the throughput of the single partition. For example, if 10 million (MIND items with an average size of 100 bytes per item are being imported, the data import may need roughly 8,000 IOPs for completion within a target time of one hour. However, data import may be limited to 1,500 IOPs per partition so that the data import may take at least five hours for completion. Furthermore, if more than 1,500 IOPs is used on the partition, then the data import may take even longer, time out, or cause throttling to live application traffic.

To ensure that import traffic does not impact live application traffic and ensure that data imports complete quickly and predictably, the data import system may create additional partitions for the importing table. For example, to import 1 TB of data with 500 byte items within one hour, the data import system may create at least 1,400 additional partitions. After the import completes, these partitions may be become cold until the next data import on the table is executed. In some aspects, these partitions may be subsequently merged after they become cold. In some aspects, the target throughput of a partition may be initiated a first lower rate and subsequently increase in throughput rate over time as needed.

In some aspects, the data import system may not consume all capacity for a given partition of a table during data import to avoid impacting a live application. In some aspects, the data import system may use a data import rate such a specified IOPS value provided by the storage node to limit the rate of import data transmitted through the storage node so as not to interfere with data transmission through the same storage node to a live application. In some aspects, the data import system may use a data import rate such a fixed target throttle IOPS value to limit the rate of import data transmitted through the storage node so as not to interfere with data transmission through the same storage node to a live application. These features may minimize the number of requests sent to the storage nodes that are throttled. Further, the requests may not consume IOPs but may consume capacity out of the thread pool used by handle requests. Minimizing throttled requests may improve customer availability by lessening 500s caused by busy thread pool (BTP) errors.

In some aspects, the data import system may not impact live application traffic during data import. For example, a storage node may have the capability to reduce the IOPs available to a user when data from a partition is importing on the storage node. To ensure that import times are predictable, the data import system may remediate the amount of data passing through the storage node by splitting and/or moving the partition. In some aspects, storage nodes may report partitions as candidates for split and/or move. An administrator system may use this information to determine whether or not to split and/or move the partition. The data import system may leverage these features for delegated operations. An alternative design may include moving the responsibility to an administrator system for indicating that a partition is splitable and/or movable from storage node to data import. In some aspects, data import may only determine how much throughput data import needs and may not be aware of what throughput other delegated operations need. Split and/or move decisions may be made holistically with information about all delegated operations and their allocations.

As described herein, the data import system may rate limit the data import so the data import does not consume all capacity for a given partition of a table. If all capacity is consumed for a given partition of a table, the live application may be impacted. The storage node may provide an IOPs value to the data import system to limit the data import rate. In some aspects, the data import system may limit the data import rate according to a fixed target throttle rate.

As described herein, the data import system may import data without impacting operation of live application traffic associated with the respective table. The storage node may reduce the IOPs available to clients when a partition becomes active (e.g., gets hot). To ensure that import data times are predictable, the administrator service and/or the storage may split and/or move the partition. For example, a storage node may identify and report partitions as candidates to be split and/or move and the administrator service may use this information to determine whether or not to split and/or moved the partition. Alternatively, an administrator service may identify partitions as candidates to be split and/or moved and determine whether or not to split and/or move the partition.

In some aspects, respective storage nodes may have minimum and/or maximum data throughputs that are used by the storage node and/or an administrator service to determine whether a partition is to be split and/or moved to accommodate the traffic. For example, a minimum data throughput through a storage node may be 0 IOPs and a maximum data throughput through the storage node may be 1000 WCU for a particular user. The storage node may have a total data import capacity of 1500 WCUs. If the particular user is utilizing the data import system to import data through the storage node, the maximum data throughput may be increased from 1000 WCU to 1200 WCU so that the maximum available throughput for the user (e.g., conducting live application processes) may maintain the maximum 1000 WCU throughput while another 200 WCUs may be allocated to the data import.

In some aspects, the data import system may complete a data import within a predictable amount time while the data import is rate limited at a per-partition level to avoid impacting live application traffic. For example, the data import system may preprocess input data to determine an ideal partitioning of the target table, ensure a 1:N relation among import worker and partitions, and implement a local rate limiting strategy. Additionally, or alternatively, the data import system may integrate with a GAC at a per-partition level and implementing a strategy to dynamically estimate the amount of time to import data to a partition and split the partition when it has insufficient capacity based on the estimate.

Preprocessing import data may have several advantages. For example, preprocessing import data may avoid complexities by removing the need to integrate the Import Data Putter with GAC. This may include modifying GAC to support buckets for generic resource types, scaling of GAC servers to support the added request rate, and scaling of GAC clients to support batch APIs for cases where tables have a large number of partitions. As another example, preprocessing import data may avoid complexities by removing the need to build mechanisms in import to dynamically determine when a given partition needs to be split. A storage node and an administrator service may be able to continue to be the authority on managing data rates (e.g., heat) across a plurality of storage nodes. This feature may enable future optimizations such as the introduction of a batch write operation that aggregates multiple writes into a single request/replication log entry or a logical heal for imports into new tables. In addition, the feature may enable future projects to pre-split global secondary indexes for import, restore, and index build operations. For example, in some current systems, restores with global secondary indexes may be slower due to an inability to accurately pre-split partitions. Preprocessing data imports enables easier debugging in the face of correctness and/or performance errors. Parsing request logs for a single client is simpler to debug than request logs for thousands of clients making concurrent requests.

In some aspects, the data import system may preprocess data for import to analyze and bucket input data using, for example, GLUE® or EMR®/SPARK®. GLUE® may be a server-less system the reduces and/or avoid the need to manage capacity, patching, and the like to provide lower operations/on-going maintenance costs.

Figure 11:
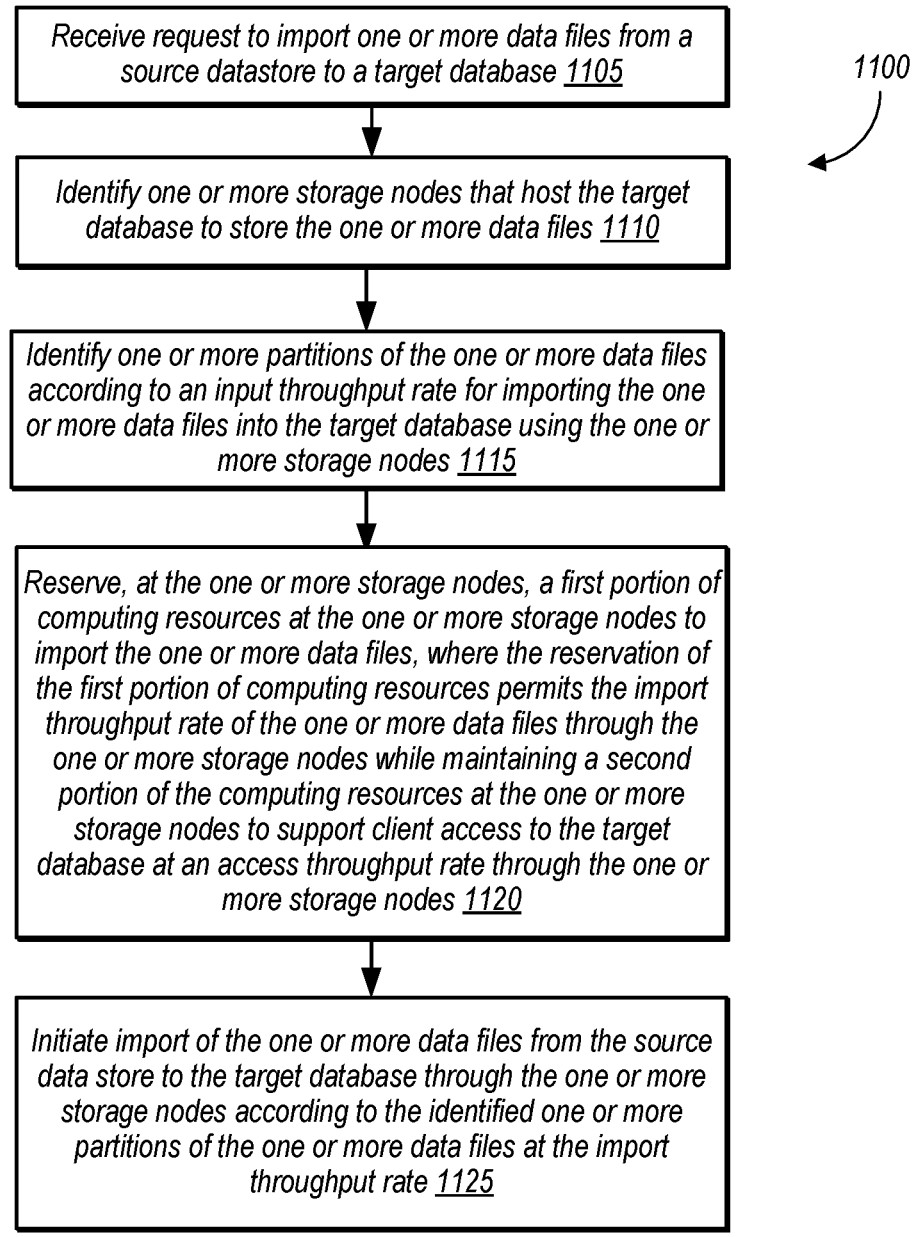
FIG. 11 is a flowchart illustrating a method for importing import data to a new data base system according to some aspects.

FIG. 11 is a flowchart illustrating a method 1100 for importing import data to a new data base system according to some aspects.

As indicated at 1105, an import data system may receive a request to import one or more data files and/or one or more data items from a source data store (e.g., a legacy database system) to a target database (e.g., a new database system). In some aspects, the request to import the one or more data files from the source data store to the target database hosted by the database service includes a request to import the one or more data files to an existing data table. For example, a table may be present in the target database and a request to store additional data files and/or additional data items in the table present in the target database may be received. In some aspects, the request to import the one or more data files from the source data store to the target database hosted by the database service includes a request to import the one or more data files to a new data table. For example, a new table may be created in the target database for storing data files and/or data items associated with the request to store data files and/or data items in the target database. In some aspects, the source data store may be hosted within a provider network of the target database. In some aspects, the source data store is hosted outside a provider network of the target database.

As indicated at 1110, the import data system may identify one or more storage nodes that host the target database to store the one or more data files. In some aspects, the one or more storage nodes may include a respective token bucket for controlling an import data rate through the respective storage node. In some aspects, the import data system may allocate one or more storage nodes of the target database for storing the one or more data files and/or the one or more data items from the source data store in response to or responsive to receiving a request to import one or more data files and/or one or more data items from the source data store to the target database.

As indicated at 1115, the import data system may identify one or more partitions of the one or more data files according to an import throughput rate for importing the one or more data files into the target database using the one or more storage nodes. In some aspects, the import data system may preprocess the one or more data files and/or the one or more data items from the first database system to identify one or more data file partitions according to a threshold throughput rate or import throughput rate for importing the one or more data files to the target database using the one or more storage nodes. For example, the identification of the one or more data file partitions according to a threshold throughput rate for importing the one or more data files to the target database using the one or more storage nodes may be based on the allocation of the one or more storage nodes of the target database for storing the one or more data files from the source data store. In some aspects, the import data system may preprocess the one or more data files and/or the one or more data items from the source data store to generate one or more secondary base files in the target database to receive the one or more data files. In some aspects, the import data system may preprocess the one or more data files and/or the one or more data items from the source data store in response to or responsive to receiving a request to import one or more data files and/or one or more data items from the source data store to the target database.

As indicated at 1120, the import data system may reserve, at the one or more storage nodes, a first portion of computing resources at the one or more storage nodes to import the one or more data files. The reservation of the first portion of computing resources may permit the import throughput rate of the one or more data files through the one or more storage nodes while maintaining a second portion of the computing resources at the one or more storage nodes to support client access to the target database at an access throughput rate through the one or more storage nodes.

As indicated at 1125, the import data system may initiate import of the one or more data files from the source data store to the target database through the one or more storage nodes according to the identified one or more partitions of the one or more data files at the import throughput rate.

Figure 12:
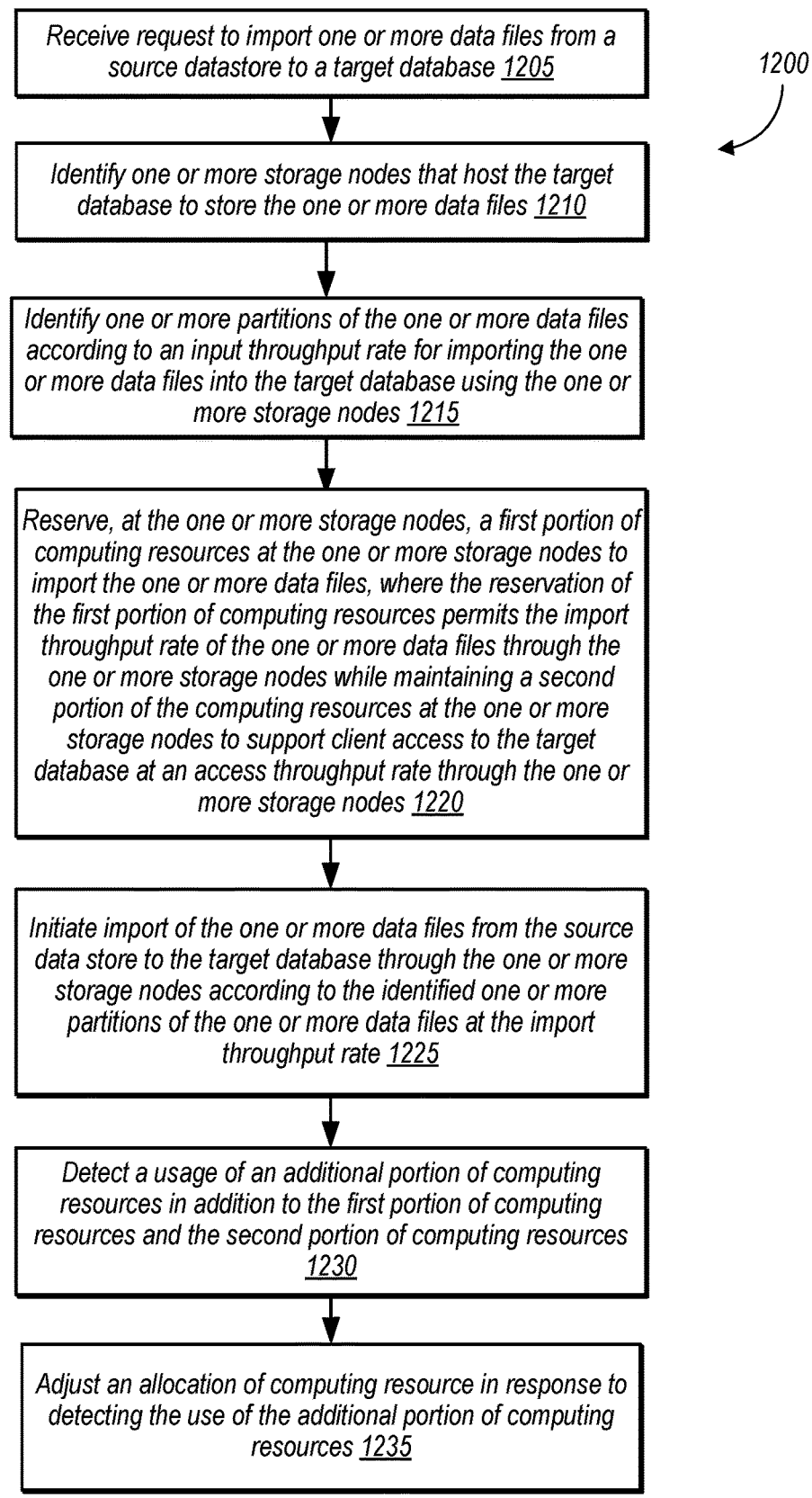
FIG. 12 is a flowchart illustrating a method for importing import data to a new data base system according to some aspects.

FIG. 12 is a flowchart illustrating a method 1200 for importing import data to a new data base system according to some aspects.

As indicated at 1205, an import data system may receive a request to import one or more data files and/or one or more data items from a source data store (e.g., a legacy database system) to a target database (e.g., a new database system). In some aspects, the request to import the one or more data files from the source data store to the target database hosted by the database service includes a request to import the one or more data files to an existing data table. For example, a table may be present in the target database and a request to store additional data files and/or additional data items in the table present in the target database may be received. In some aspects, the request to import the one or more data files from the source data store to the target database hosted by the database service includes a request to import the one or more data files to a new data table. For example, a new table may be created in the target database for storing data files and/or data items associated with the request to store data files and/or data items in the target database. In some aspects, the source data store may be hosted within a provider network of the target database. In some aspects, the source data store is hosted outside a provider network of the target database.

As indicated at 1210, the import data system may identify one or more storage nodes that host the target database to store the one or more data files. In some aspects, the one or more storage nodes may include a respective token bucket for controlling an import data rate through the respective storage node. In some aspects, the import data system may allocate one or more storage nodes of the target database for storing the one or more data files and/or the one or more data items from the source data store in response to or responsive to receiving a request to import one or more data files and/or one or more data items from the source data store to the target database.

As indicated at 1215, the import data system may identify one or more partitions of the one or more data files according to an import throughput rate for importing the one or more data files into the target database using the one or more storage nodes. In some aspects, the import data system may preprocess the one or more data files and/or the one or more data items from the first database system to identify one or more data file partitions according to a threshold throughput rate or import throughput rate for importing the one or more data files to the target database using the one or more storage nodes. For example, the identification of the one or more data file partitions according to a threshold throughput rate for importing the one or more data files to the target database using the one or more storage nodes may be based on the allocation of the one or more storage nodes of the target database for storing the one or more data files from the source data store. In some aspects, the import data system may preprocess the one or more data files and/or the one or more data items from the source data store to generate one or more secondary base files in the target database to receive the one or more data files. In some aspects, the import data system may preprocess the one or more data files and/or the one or more data items from the source data store in response to or responsive to receiving a request to import one or more data files and/or one or more data items from the source data store to the target database.

As indicated at 1220, the import data system may reserve, at the one or more storage nodes, a first portion of computing resources at the one or more storage nodes to import the one or more data files. The reservation of the first portion of computing resources may permit the import throughput rate of the one or more data files through the one or more storage nodes while maintaining a second portion of the computing resources at the one or more storage nodes to support client access to the target database at an access throughput rate through the one or more storage nodes.

As indicated at 1225, the import data system may initiate import of the one or more data files from the source data store to the target database through the one or more storage nodes according to the identified one or more partitions of the one or more data files at the import throughput rate.

As indicated at 1230, the import data system may detect a usage of an additional portion of computing resources in addition to the first portion of computing resources and the second portion of computing resources, and, as indicated at 1235, the import data system may adjust an allocation of computing resources in response to detecting the usage of the additional portion of computing resources. For example, the additional portion of computing resources may support client access to at least one of one or more global secondary indexes or one or more global tables. In some aspects, adjusting the allocation of computing resources may include at least one of increasing a total quantity of available computing resources to accommodate the first portion of computing resources, the second portion of computing resources, and the additional portion of computing resources or decreasing the first portion of computing resources to maintain at least one of the second portion of computing resources or the additional portion of computing resources. For example, the import data system, upon detecting a usage of an additional portion of computing resources in addition to the first portion of computing resources and the second portion of computing resources, may transmit one or more signals to one or more data import workers to increase a total quantity of available computing resources so that at least one of the first portion of computing resources, the second portion of computing resource, or the additional portion of computing resources does not decrease. Additionally, or alternatively, the import data system, upon detecting a usage of an additional portion of computing resources in addition to the first portion of computing resources and the second portion of computing resources, may transmit one or more signals to one or more data import workers to decrease the first portion of computing resources so that at least one of the second portion of computing resources or the additional portion of computing resources does not decrease.

Figure 13:
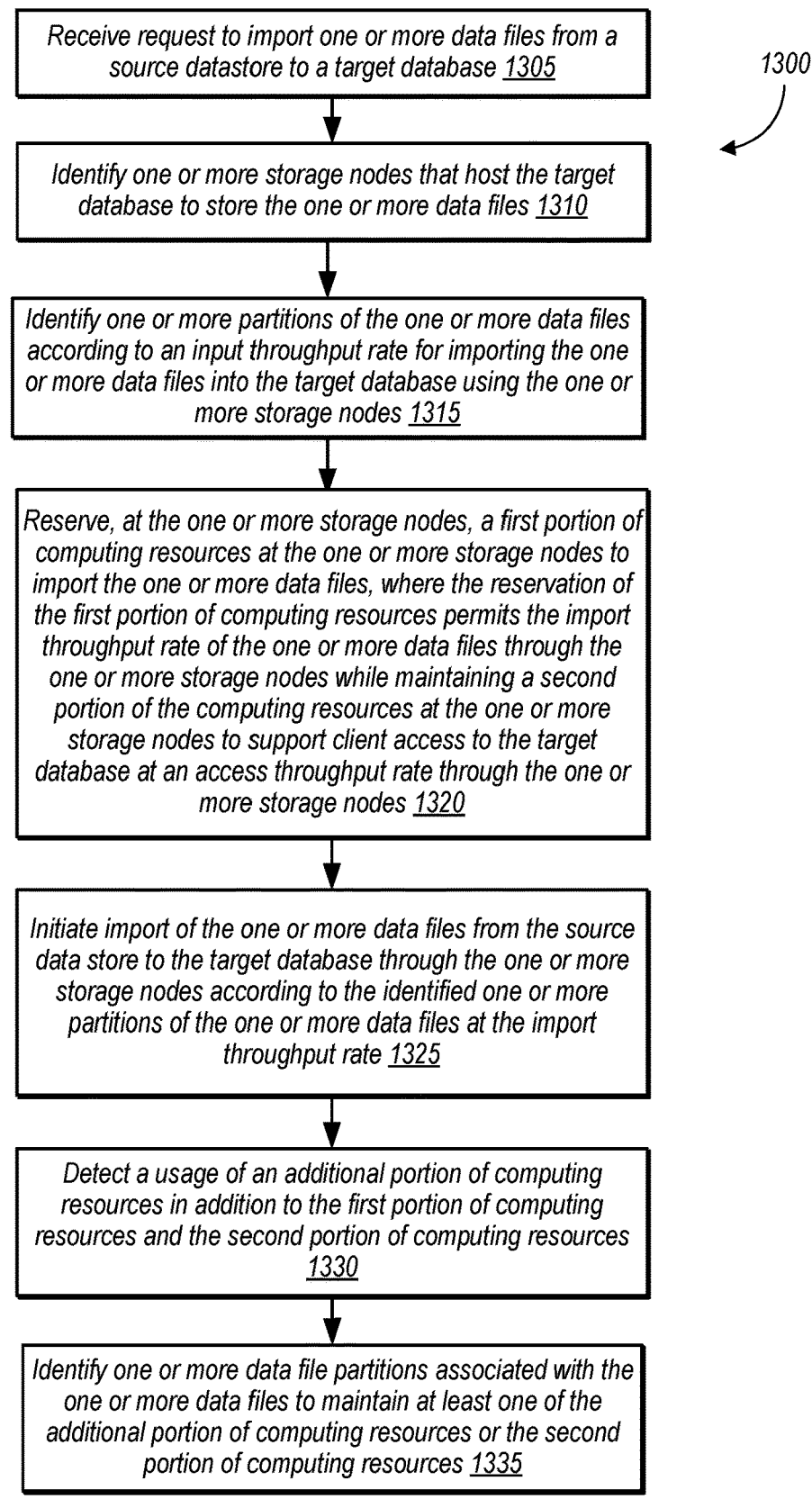
FIG. 13 is a flowchart illustrating a method for importing import data to a new data base system according to some aspects.

FIG. 13 is a flowchart illustrating a method 1300 for importing import data to a new data base system according to some aspects.

As indicated at 1305, an import data system may receive a request to import one or more data files and/or one or more data items from a source data store (e.g., a legacy database system) to a target database (e.g., a new database system). In some aspects, the request to import the one or more data files from the source data store to the target database hosted by the database service includes a request to import the one or more data files to an existing data table. For example, a table may be present in the target database and a request to store additional data files and/or additional data items in the table present in the target database may be received. In some aspects, the request to import the one or more data files from the source data store to the target database hosted by the database service includes a request to import the one or more data files to a new data table. For example, a new table may be created in the target database for storing data files and/or data items associated with the request to store data files and/or data items in the target database. In some aspects, the source data store may be hosted within a provider network of the target database. In some aspects, the source data store is hosted outside a provider network of the target database.

As indicated at 1310, the import data system may identify one or more storage nodes that host the target database to store the one or more data files. In some aspects, the one or more storage nodes may include a respective token bucket for controlling an import data rate through the respective storage node. In some aspects, the import data system may allocate one or more storage nodes of the target database for storing the one or more data files and/or the one or more data items from the source data store in response to or responsive to receiving a request to import one or more data files and/or one or more data items from the source data store to the target database.

As indicated at 1315, the import data system may identify one or more partitions of the one or more data files according to an import throughput rate for importing the one or more data files into the target database using the one or more storage nodes. In some aspects, the import data system may preprocess the one or more data files and/or the one or more data items from the first database system to identify one or more data file partitions according to a threshold throughput rate or import throughput rate for importing the one or more data files to the target database using the one or more storage nodes. For example, the identification of the one or more data file partitions according to a threshold throughput rate for importing the one or more data files to the target database using the one or more storage nodes may be based on the allocation of the one or more storage nodes of the target database for storing the one or more data files from the source data store. In some aspects, the import data system may preprocess the one or more data files and/or the one or more data items from the source data store to generate one or more secondary base files in the target database to receive the one or more data files. In some aspects, the import data system may preprocess the one or more data files and/or the one or more data items from the source data store in response to or responsive to receiving a request to import one or more data files and/or one or more data items from the source data store to the target database.

As indicated at 1320, the import data system may reserve, at the one or more storage nodes, a first portion of computing resources at the one or more storage nodes to import the one or more data files. The reservation of the first portion of computing resources may permit the import throughput rate of the one or more data files through the one or more storage nodes while maintaining a second portion of the computing resources at the one or more storage nodes to support client access to the target database at an access throughput rate through the one or more storage nodes.

As indicated at 1325, the import data system may initiate import of the one or more data files from the source data store to the target database through the one or more storage nodes according to the identified one or more partitions of the one or more data files at the import throughput rate.

As indicated at 1330, the import data system may detect a usage of an additional portion of computing resources in addition to the first portion of computing resources and the second portion of computing resources, and, as indicated at 1335, the import data system may identify one or more data file partitions associated with the one or more data files to maintain at least one of the additional portion of computing resources or the second portion of computing resources.

Figure 14:
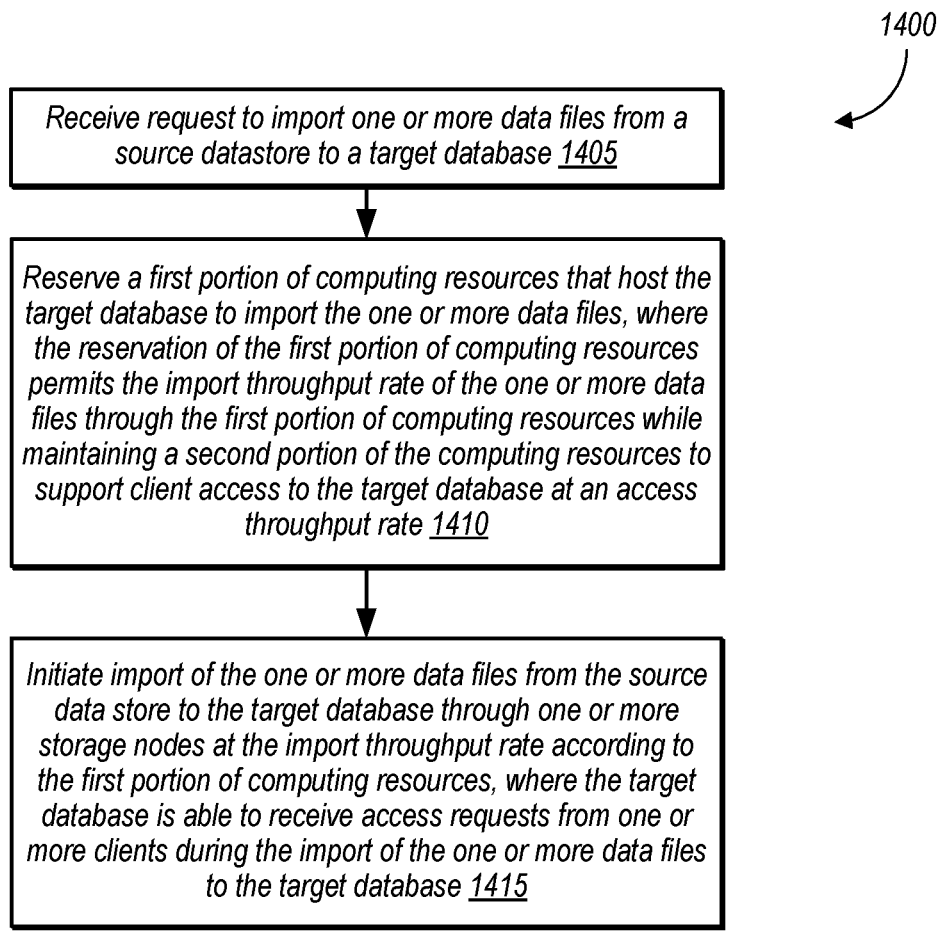
FIG. 14 is a flowchart illustrating a method for importing import data to a new data base system according to some aspects.

FIG. 14 is a flowchart illustrating a method 1400 for importing import data to a new data base system according to some aspects.

As indicated at 1405, an import data system may receive a request to import one or more data files and/or one or more data items from a source data store (e.g., a legacy database system) to a target database (e.g., a new database system). In some aspects, the request to import the one or more data files from the source data store to the target database hosted by the database service includes a request to import the one or more data files to an existing data table. For example, a table may be present in the target database and a request to store additional data files and/or additional data items in the table present in the target database may be received. In some aspects, the request to import the one or more data files from the source data store to the target database hosted by the database service includes a request to import the one or more data files to a new data table. For example, a new table may be created in the target database for storing data files and/or data items associated with the request to store data files and/or data items in the target database. In some aspects, the source data store may be hosted within a provider network of the target database. In some aspects, the source data store is hosted outside a provider network of the target database.

In some aspects, the import data system may identify one or more storage nodes that host the target database to store the one or more data files. In some aspects, the one or more storage nodes may include a respective token bucket for controlling an import data rate through the respective storage node. In some aspects, the import data system may allocate one or more storage nodes of the target database for storing the one or more data files and/or the one or more data items from the source data store in response to or responsive to receiving a request to import one or more data files and/or one or more data items from the source data store to the target database.

In some aspects, the import data system may identify one or more partitions of the one or more data files according to an import throughput rate for importing the one or more data files into the target database using the one or more storage nodes. In some aspects, the import data system may preprocess the one or more data files and/or the one or more data items from the first database system to identify one or more data file partitions according to a threshold throughput rate or import throughput rate for importing the one or more data files to the target database using the one or more storage nodes. For example, the identification of the one or more data file partitions according to a threshold throughput rate for importing the one or more data files to the target database using the one or more storage nodes may be based on the allocation of the one or more storage nodes of the target database for storing the one or more data files from the source data store. In some aspects, the import data system may preprocess the one or more data files and/or the one or more data items from the source data store to generate one or more secondary base files in the target database to receive the one or more data files. In some aspects, the import data system may preprocess the one or more data files and/or the one or more data items from the source data store in response to or responsive to receiving a request to import one or more data files and/or one or more data items from the source data store to the target database.

As indicated at 1410, the import data system may reserve a first portion of computing resources that host the target database to import the one or more data files. The reservation of the first portion of computing resources may permit the import throughput rate of the one or more data files through the first portion of computing resources while maintaining a second portion of the computing resources to support client access to the target database at an access throughput rate.

As indicated at 1415, the import data system may initiate import of the one or more data files from the source data store to the target database through one or more storage nodes at the import throughput rate according to the first portion of computing resources. The target database may be able to receive access requests from one or more clients during the import of the one or more data files to the target database.

Figure 15:
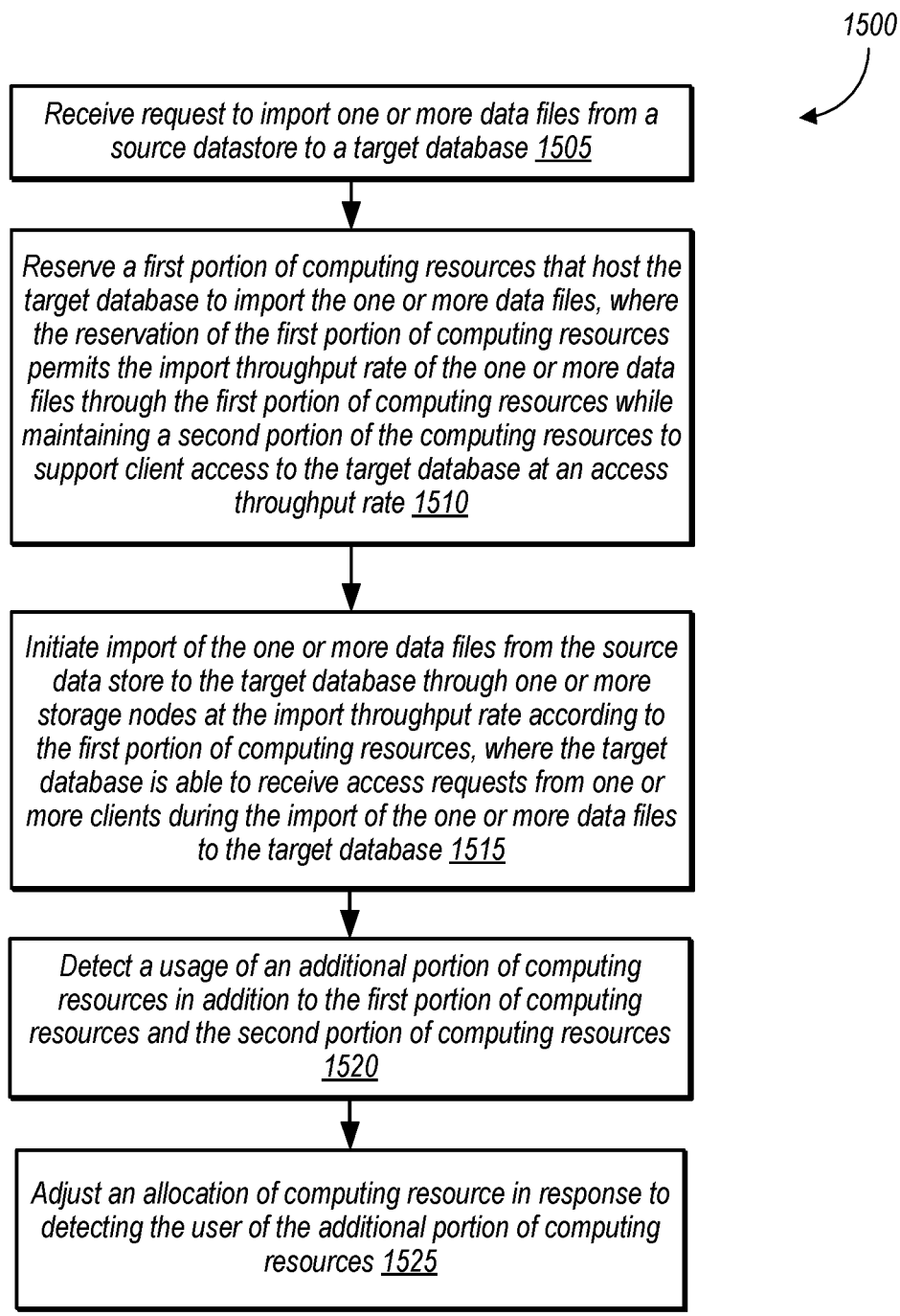
FIG. 15 is a flowchart illustrating a method for importing import data to a new data base system according to some aspects.

FIG. 15 is a flowchart illustrating a method 1500 for importing import data to a new data base system according to some aspects.

As indicated at 1505, an import data system may receive a request to import one or more data files and/or one or more data items from a source data store (e.g., a legacy database system) to a target database (e.g., a new database system). In some aspects, the request to import the one or more data files from the source data store to the target database hosted by the database service includes a request to import the one or more data files to an existing data table. For example, a table may be present in the target database and a request to store additional data files and/or additional data items in the table present in the target database may be received. In some aspects, the request to import the one or more data files from the source data store to the target database hosted by the database service includes a request to import the one or more data files to a new data table. For example, a new table may be created in the target database for storing data files and/or data items associated with the request to store data files and/or data items in the target database. In some aspects, the source data store may be hosted within a provider network of the target database. In some aspects, the source data store is hosted outside a provider network of the target database.

In some aspects, the import data system may identify one or more storage nodes that host the target database to store the one or more data files. In some aspects, the one or more storage nodes may include a respective token bucket for controlling an import data rate through the respective storage node. In some aspects, the import data system may allocate one or more storage nodes of the target database for storing the one or more data files and/or the one or more data items from the source data store in response to or responsive to receiving a request to import one or more data files and/or one or more data items from the source data store to the target database.

In some aspects, the import data system may identify one or more partitions of the one or more data files according to an import throughput rate for importing the one or more data files into the target database using the one or more storage nodes. In some aspects, the import data system may preprocess the one or more data files and/or the one or more data items from the first database system to identify one or more data file partitions according to a threshold throughput rate or import throughput rate for importing the one or more data files to the target database using the one or more storage nodes. For example, the identification of the one or more data file partitions according to a threshold throughput rate for importing the one or more data files to the target database using the one or more storage nodes may be based on the allocation of the one or more storage nodes of the target database for storing the one or more data files from the source data store. In some aspects, the import data system may preprocess the one or more data files and/or the one or more data items from the source data store to generate one or more secondary base files in the target database to receive the one or more data files. In some aspects, the import data system may preprocess the one or more data files and/or the one or more data items from the source data store in response to or responsive to receiving a request to import one or more data files and/or one or more data items from the source data store to the target database.

As indicated at 1510, the import data system may reserve a first portion of computing resources that host the target database to import the one or more data files. The reservation of the first portion of computing resources may permit the import throughput rate of the one or more data files through the first portion of computing resources while maintaining a second portion of the computing resources to support client access to the target database at an access throughput rate.

As indicated at 1515, the import data system may initiate import of the one or more data files from the source data store to the target database through one or more storage nodes at the import throughput rate according to the first portion of computing resources. The target database may be able to receive access requests from one or more clients during the import of the one or more data files to the target database.

As indicated at 1520, the import data system may detect a usage of an additional portion of computing resources in addition to the first portion of computing resources and the second portion of computing resources, and, as indicated at 1525, the import data system may adjust an allocation of computing resources in response to detecting the usage of the additional portion of computing resources. For example, the additional portion of computing resources may support client access to at least one of one or more global secondary indexes or one or more global tables. In some aspects, adjusting the allocation of computing resources may include at least one of increasing a total quantity of available computing resources to accommodate the first portion of computing resources, the second portion of computing resources, and the additional portion of computing resources or decreasing the first portion of computing resources to maintain at least one of the second portion of computing resources or the additional portion of computing resources. For example, the import data system, upon detecting a usage of an additional portion of computing resources in addition to the first portion of computing resources and the second portion of computing resources, may transmit one or more signals to one or more data import workers to increase a total quantity of available computing resources so that at least one of the first portion of computing resources, the second portion of computing resource, or the additional portion of computing resources does not decrease. Additionally, or alternatively, the import data system, upon detecting a usage of an additional portion of computing resources in addition to the first portion of computing resources and the second portion of computing resources, may transmit one or more signals to one or more data import workers to decrease the first portion of computing resources so that at least one of the second portion of computing resources or the additional portion of computing resources does not decrease.

Figure 16:
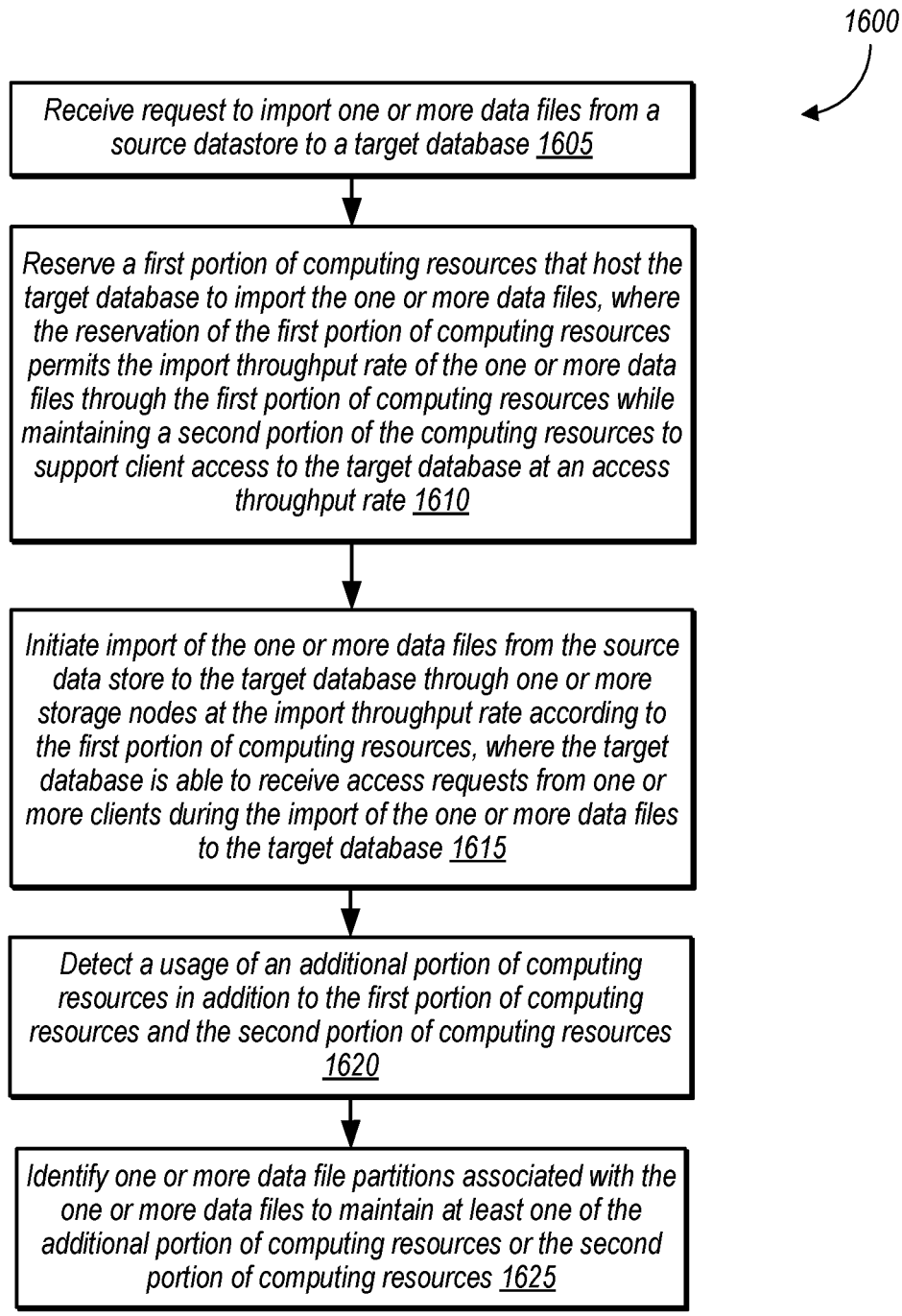
FIG. 16 is a flowchart illustrating a method for importing import data to a new data base system according to some aspects.

FIG. 16 is a flowchart illustrating a method 1600 for importing import data to a new data base system according to some aspects.

As indicated at 1605, an import data system may receive a request to import one or more data files and/or one or more data items from a source data store (e.g., a legacy database system) to a target database (e.g., a new database system). In some aspects, the request to import the one or more data files from the source data store to the target database hosted by the database service includes a request to import the one or more data files to an existing data table. For example, a table may be present in the target database and a request to store additional data files and/or additional data items in the table present in the target database may be received. In some aspects, the request to import the one or more data files from the source data store to the target database hosted by the database service includes a request to import the one or more data files to a new data table. For example, a new table may be created in the target database for storing data files and/or data items associated with the request to store data files and/or data items in the target database. In some aspects, the source data store may be hosted within a provider network of the target database. In some aspects, the source data store is hosted outside a provider network of the target database.

In some aspects, the import data system may identify one or more storage nodes that host the target database to store the one or more data files. In some aspects, the one or more storage nodes may include a respective token bucket for controlling an import data rate through the respective storage node. In some aspects, the import data system may allocate one or more storage nodes of the target database for storing the one or more data files and/or the one or more data items from the source data store in response to or responsive to receiving a request to import one or more data files and/or one or more data items from the source data store to the target database.

In some aspects, the import data system may identify one or more partitions of the one or more data files according to an import throughput rate for importing the one or more data files into the target database using the one or more storage nodes. In some aspects, the import data system may preprocess the one or more data files and/or the one or more data items from the first database system to identify one or more data file partitions according to a threshold throughput rate or import throughput rate for importing the one or more data files to the target database using the one or more storage nodes. For example, the identification of the one or more data file partitions according to a threshold throughput rate for importing the one or more data files to the target database using the one or more storage nodes may be based on the allocation of the one or more storage nodes of the target database for storing the one or more data files from the source data store. In some aspects, the import data system may preprocess the one or more data files and/or the one or more data items from the source data store to generate one or more secondary base files in the target database to receive the one or more data files. In some aspects, the import data system may preprocess the one or more data files and/or the one or more data items from the source data store in response to or responsive to receiving a request to import one or more data files and/or one or more data items from the source data store to the target database.

As indicated at 1610, the import data system may reserve a first portion of computing resources that host the target database to import the one or more data files. The reservation of the first portion of computing resources may permit the import throughput rate of the one or more data files through the first portion of computing resources while maintaining a second portion of the computing resources to support client access to the target database at an access throughput rate.

As indicated at 1615, the import data system may initiate import of the one or more data files from the source data store to the target database through one or more storage nodes at the import throughput rate according to the first portion of computing resources. The target database may be able to receive access requests from one or more clients during the import of the one or more data files to the target database.

As indicated at 1620, the import data system may detect a usage of an additional portion of computing resources in addition to the first portion of computing resources and the second portion of computing resources, and, as indicated at 1625, the import data system may identify one or more data file partitions associated with the one or more data files to maintain at least one of the additional portion of computing resources or the second portion of computing resources.

The methods described herein may in various embodiments be implemented by any combination of hardware and software. For example, in some embodiments, the methods may be implemented by a computer system (e.g., a computer system as in FIG. 17) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 17:
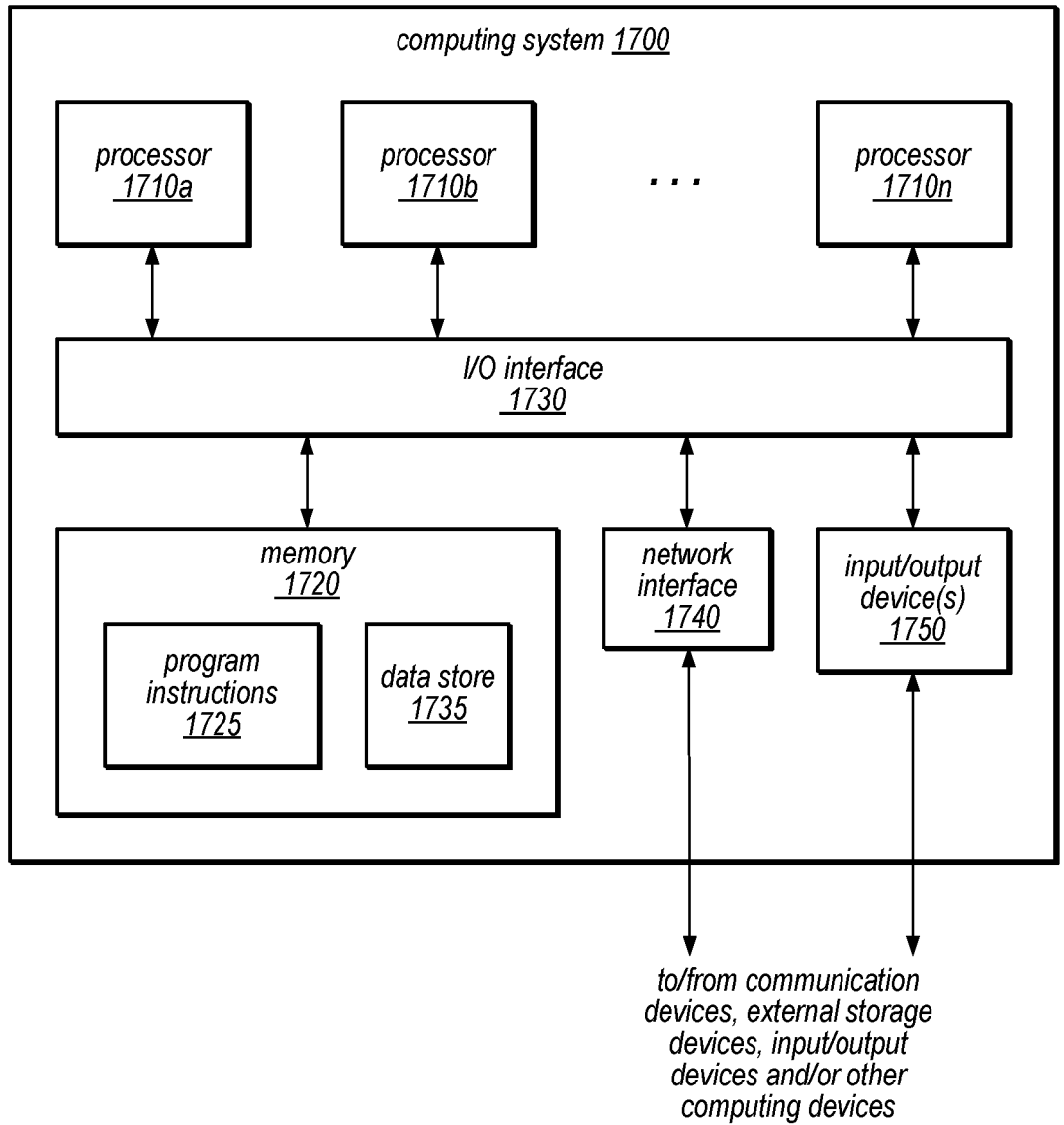
FIG. 17 is a block diagram illustrating an example computing system, according to some embodiments.

Embodiments to implement offline builds for projected data subsets as described herein may be executed on one or more computer systems, which may interact with various other devices. One such computer system is illustrated by FIG. 17. In different embodiments, computer system 1700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1700 includes one or more processors 1710 coupled to a system memory 1720 via an input/output (I/O) interface 1730. Computer system 1700 further includes a network interface 1740 coupled to I/O interface 1730, and one or more input/output devices 1750, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1700, while in other embodiments multiple such systems, or multiple nodes making up computer system 1700, may host different portions or instances of embodiments. For example, in some embodiments some elements may be implemented via one or more nodes of computer system 1700 that are distinct from those nodes implementing other elements.

In various embodiments, computer system 1700 may be a uniprocessor system including one processor 1710, or a multiprocessor system including several processors 1710 (e.g., two, four, eight, or another suitable number). Processors 1710 may be any suitable processor capable of executing instructions, in some embodiments. For example, in various embodiments, processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA.

In some embodiments, at least one processor 1710 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1720 may store program instructions 1725 and/or data accessible by processor 1710 to implement associating a function with a table in a database system, in some embodiments. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1720 as program instructions 1725 and data storage 1735, respectively. In other embodiments, program instructions and/or data may be received, sent or stored upon different types of computer-accessible media or on similar media separate from system memory 1720 or computer system 1700. A computer-accessible medium may include non-transitory storage media or memory media such as magnetic or optical media, e.g., disk or CD/DVD-ROM coupled to computer system 1700 via I/O interface 1730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1740, in some embodiments.

In some embodiments, I/O interface 1730 may be coordinate I/O traffic between processor 1710, system memory 1720, and any peripheral devices in the device, including network interface 1740 or other peripheral interfaces, such as input/output devices 1750. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. In addition, in some embodiments some or all of the functionality of I/O interface 1730, such as an interface to system memory 1720, may be incorporated directly into processor 1710.

Network interface 1740 may allow data to be exchanged between computer system 1700 and other devices attached to a network, such as other computer systems, or between nodes of computer system 1700, in some embodiments. In various embodiments, network interface 1740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1750 may, in some embodiments, include one or more display terminals, keyboards, keypads, touchpads, scanning devices, voice or optical recognition devices, or any other devices suitable for entering or retrieving data by one or more computer system 1700, in some embodiments. Multiple input/output devices 1750 may be present in computer system 1700 or may be distributed on various nodes of computer system 1700, in some embodiments. In some embodiments, similar input/output devices may be separate from computer system 1700 and may interact with one or more nodes of computer system 1700 through a wired or wireless connection, such as over network interface 1740.

As shown in FIG. 17, memory 1720 may include program instructions 1725, that implement the various embodiments of the systems as described herein, and data store 1735, comprising various data accessible by program instructions 1725, in some embodiments. In some embodiments, program instructions 1725 may include software elements of embodiments as described herein and as illustrated in the Figures. Data storage 1735 may include data that may be used in embodiments. In other embodiments, other or different software elements and data may be included.

Those skilled in the art will appreciate that computer system 1700 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1700 may be transmitted to computer system 1700 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
 a plurality of computing devices, respectively comprising a processor and a memory, that implement a database service, wherein the database service is configured to:
  receive a request to import one or more data files from a source data store to a target database hosted by the database service;
  responsive to the request:
   identify one or more storage nodes that host the target database to store the one or more data files;
   identify one or more partitions of the one or more data files according to an import throughput rate for importing the one or more data files into the target database using the one or more storage nodes;

reserve, at the one or more storage nodes, a first portion of computing resources at the one or more storage nodes to import the one or more data files, wherein the reservation of the first portion of computing resources permits the import throughput rate of the one or more data files through the one or more storage nodes while maintaining a second portion of the computing resources at the one or more storage nodes to support client access to the target database at an access throughput rate through the one or more storage nodes; and initiate import of the one or more data files from the source data store to the target database through the one or more storage nodes according to the identified one or more partitions of the one or more data files at the import throughput rate.

2. The system of claim 1, wherein the request to import the one or more data files from the source data store to the target database hosted by the database service comprises a request to import the one or more data files to an existing data table.

3. The system of claim 1, wherein the request to import the one or more data files from the source data store to the target database hosted by the database service comprises a request to import the one or more data files to a new data table.

4. The system of claim 1, wherein the source data store is hosted within a provider network.

5. The system of claim 1, wherein the source data store is hosted outside of a provider network.

6. A method, comprising:
receiving a request to import one or more data files from a source data store into a target database;
responsive to the request:
reserving a first portion of computing resources that host the target database to import the one or more data files, wherein the reservation of the first portion of computing resources permits the import throughput rate of the one or more data files through the first portion of computing resources while maintaining a second portion of the computing resources to support client access to the target database at an access throughput rate; and
initiating import of the one or more data files from the source data store to the target database through one or more storage nodes at the import throughput rate according to the first portion of computing resources, wherein the target database is able to receive access requests from one or more clients during the import of the one or more data files to the target database.

7. The method of claim 6, wherein the request to import the one or more data files from the source data store to the target database hosted by the database service comprises a request to import the one or more data files to an existing data table.

8. The method of claim 6, wherein the request to import the one or more data files from the source data store to the target database hosted by the database service comprises a request to import the one or more data files to a new data table.

9. The method of claim 6, wherein the source data store is hosted within a provider network.

10. The method of claim 6, wherein the source data store is hosted outside of a provider network.

11. The method of claim 6, further comprising:
detecting a usage of an additional portion of computing resources in addition to the first portion of computing resources and the second portion of computing resources; and
adjusting an allocation of computing resources in response to detecting the usage of the additional portion of computing resources.

12. The method of claim 11, wherein the additional portion of computing resources support client access to at least one of one or more global secondary indexes or one or more global tables.

13. The method of claim 11, wherein adjusting the allocation of computing resources comprises at least one of:
increasing a total quantity of available computing resources to accommodate the first portion of computing resources, the second portion of computing resources, and the additional portion of computing resources, or
decreasing the first portion of computing resources to maintain at least one of the second portion of computing resources or the additional portion of computing resources.

14. The method of claim 6, further comprising:
detecting a usage of an additional portion of computing resources in addition to the first portion of computing resources and the second portion of computing resources; and
identifying one or more data file partitions associated with the one or more data files to maintain at least one of the additional portion of computing resources or the second portion of computing resources.

15. One or more non-transitory, computer-readable storage media, storing program instructions that when executed on or across one or more computing devices cause the one or more computing devices to implement:
receiving a request to import one or more data files from a source data store into a target database;
responsive to the request:
reserving a first portion of computing resources that host the target database to import the one or more data files, wherein the reservation of the first portion of computing resources permits the import throughput rate of the one or more data files through the first portion of computing resources while maintaining a second portion of the computing resources to support client access to the target database at an access throughput rate; and
initiating import of the one or more data files from the source data store to the target database through one or more storage nodes at the import throughput rate according to the first portion of computing resources, wherein the target database is able to receive access requests from one or more clients during the import of the one or more data files to the target database.

16. The one or more non-transitory, computer-readable storage media of claim 15, wherein the request to import the one or more data files from the source data store to the target database hosted by the database service comprises a request to import the one or more data files to an existing data table.

17. The one or more non-transitory, computer-readable storage media of claim 16, wherein the request to import the one or more data files from the source data store to the target database hosted by the database service comprises a request to import the one or more data files to a new data table.

18. The one or more non-transitory, computer-readable storage media of claim 15, wherein the source data store is hosted within a provider network.

19. The one or more non-transitory, computer-readable storage media of claim 15, wherein the source data store is hosted outside of a provider network.

20. The one or more non-transitory, computer-readable storage media of claim 15, wherein the program instructions when executed on or across the one or more computing devices further cause the one or more computing devices to implement:
- detecting a usage of an additional portion of computing resources in addition to the first portion of computing resources and the second portion of computing resources; and
- adjusting an allocation of computing resources in response to detecting the usage of the additional portion of computing resources.

\* \* \* \* \*